(12) United States Patent
Fujibayashi et al.

(10) Patent No.: US 7,962,704 B2
(45) Date of Patent: *Jun. 14, 2011

(54) STORAGE SYSTEM OF STORAGE HIERARCHY DEVICES AND A METHOD OF CONTROLLING STORAGE HIERARCHY DEVICES BASED ON A USER POLICY OF I/O PERFORMANCE AND POWER CONSUMPTION

(75) Inventors: Akira Fujibayashi, Sagamihara (JP); Kazuhisa Fujimoto, Koganei (JP); Shuji Nakamura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/474,767

(22) Filed: May 29, 2009

(65) Prior Publication Data
US 2009/0276565 A1    Nov. 5, 2009

Related U.S. Application Data

(63) Continuation of application No. 11/524,907, filed on Sep. 22, 2006, now Pat. No. 7,549,016, which is a continuation-in-part of application No. 11/258,282, filed on Oct. 26, 2005, now Pat. No. 7,568,075.

(30) Foreign Application Priority Data

Sep. 22, 2005 (JP) ................................. 2005-275018
Aug. 24, 2006 (JP) ................................. 2006-227277

(51) Int. Cl.
*G06F 12/00* (2006.01)

(52) U.S. Cl. ............ 711/154; 711/4; 711/112; 711/156; 711/165; 711/103; 713/300; 713/320

(58) Field of Classification Search .................. 711/154, 711/103, 112, 156, 165, 4; 713/300, 320
See application file for complete search history.

(56) References Cited

U.S. PATENT DOCUMENTS
5,619,453 A   4/1997   Roohparvar et al.
(Continued)

FOREIGN PATENT DOCUMENTS
WO   0041510   7/2000
(Continued)

OTHER PUBLICATIONS

"The HP AutoRAID Hierarchical Storage Ssytem" by Wilkes, et al. ACM Transactions on Computer Systems, vol. 14, No. 1, Feb. 1996, pp. 108-136.
(Continued)

*Primary Examiner* — Hong Kim
(74) *Attorney, Agent, or Firm* — Brundidge & Stanger, P.C.

(57) ABSTRACT

A storage control apparatus according to the present invention includes a plurality of connecting units connected to one or more host computers and one or more hard disk drives as storage media for storing data, one or more non-volatile storage media which are of a different type from the hard disk drives and which store data WRITE requested from the host computer, a plurality of processing units for processing WRITE and READ requests from the host computer by using the hard disk drives or the non-volatile storage media and, a plurality of memory units for storing control information to be by the processing units.

15 Claims, 20 Drawing Sheets

1000 DEVICE TYPE MANAGEMENT TABLE

| # | STORAGE HIERARCHY DEVICE TYPE | POWER CONSUMPTION AMOUNT PER A CERTAIN TIME PERIOD | NUMBER OF ACTIVE DEVICES | NUMBER OF FREE LOW POWER CONSUMPTION DEVICE POOLS |
|---|---|---|---|---|
| 0 | FLASH | 300 | 50 | 500 |
| 1 | ATA | 2000 | 80 | 10000 |
| 2 | SCSI | 5000 | 600 | - |
| 3 | CACHE | 1000 | 4 | - |
| ● | ● | ● | ● | ● |
| ● | ● | ● | ● | ● |
| ● | ● | ● | ● | ● |

1001    1002    1003    1004

U.S. PATENT DOCUMENTS

| | | | |
|---|---|---|---|
| 5,778,418 A * | 7/1998 | Auclair et al. | 711/101 |
| 6,526,472 B2 | 2/2003 | Suzuki | |
| 6,549,974 B2 | 4/2003 | Kaki et al. | |
| 6,567,334 B2 * | 5/2003 | Yamagami et al. | 365/230.01 |
| 6,601,132 B2 | 7/2003 | Nomura et al. | |
| 6,763,442 B2 | 7/2004 | Arakawa et al. | |
| 6,965,956 B1 * | 11/2005 | Herz et al. | 710/74 |
| 7,028,158 B1 | 4/2006 | Beatty et al. | |
| 7,197,613 B2 | 3/2007 | Shibuya et al. | |
| 7,568,075 B2 * | 7/2009 | Fujibayashi et al. | 711/154 |
| 2002/0041517 A1 | 4/2002 | Kim et al. | |
| 2003/0028733 A1 | 2/2003 | Tsunoda et al. | |
| 2003/0204597 A1 * | 10/2003 | Arakawa et al. | 709/226 |
| 2004/0024796 A1 | 2/2004 | Takeda et al. | |
| 2004/0054939 A1 | 3/2004 | Guha et al. | |
| 2004/0158775 A1 | 8/2004 | Shibuya et al. | |
| 2004/0162940 A1 | 8/2004 | Yagisawa et al. | |
| 2004/0225662 A1 | 11/2004 | Nojima | |
| 2005/0033936 A1 | 2/2005 | Nakano et al. | |
| 2005/0055603 A1 | 3/2005 | Soran et al. | |
| 2005/0120175 A1 | 6/2005 | Shimada et al. | |
| 2005/0204187 A1 | 9/2005 | Lee et al. | |
| 2006/0047930 A1 * | 3/2006 | Takahashi et al. | 711/162 |
| 2007/0067559 A1 | 3/2007 | Fujibayashi et al. | |
| 2007/0079054 A1 | 4/2007 | Rudelic | |

FOREIGN PATENT DOCUMENTS

| | | |
|---|---|---|
| WO | 0041510 A2 | 7/2000 |

OTHER PUBLICATIONS

The Case for Massive Arrays of Idle Disks (MAID) by D. Colarelli, et al. Dept. of Computer Science Univ. of Colorado, Boulder. Jan. 2002.

Weiss, Peter, "Morphing Memory" Jun. 4, 2005, Science News online vol. 167, No. 23, p. 363 retrieved from http://www.sciencenews.org/articles/20050604/bob9.asp.

Fram technology basics: 2004 Ramtron International. Retrieved from http://www.ramtron.com/doc/AboutFRAM/technology.asp as archived by www.archive.org.

"MAID: Massive Array of Idle Disks" Aug. 2, 2004. Retrieved from http://www.backupcritic.com/news/2004/08/20040801.html.

European Search Report dated Sep. 21, 2009 for corresponding European Patent Application No. 09008667.9.

European Examination Report dated Oct. 18, 2010, issued in corresponding European Patent Application No. 09 008 667.9.

* cited by examiner

FIG.7

700 LOGICAL VOLUME MANAGEMENT TABLE

| # | LOGICAL VOLUME ID | LOGICAL DEVICE ID | VIRTUAL DEVICE ID | DEVICE ID | DEVICE EXTENT |
|---|---|---|---|---|---|
| 0 | 2 | 001 | 001 | 1001 | 0h,8FFFFh |
| 1 | 3 | 002 | 005 | 1003 | 0h,4FFFFh |
| 2 | 3 | 002 | 004 | 1004 | 0h,3FFFFh |
| 3 | 3 | 002 | 003 | 1005 | 0h,5FFFFh |
| 4 | 4 | 004 | 002 | 004 | 0h,3FFFFh |
| 5 | 5 | 006 | 009 | 004 | 40000h,8FFFFh |
| 6 | 5 | 006 | 008 | 005 | 0h,5FFFFh |
| 7 | 5 | 006 | 007 | 007 | 0h,6FFFFh |
| ● | ● | ● | ● | ● | ● |
| ● | ● | ● | ● | ● | ● |
| ● | ● | ● | ● | ● | ● |
| | 701 | 702 | 703 | 704 | 705 |

FIG.8

800 USAGE STATUS MANAGEMENT TABLE

| # | DEVICE ID | TOTAL CYCLES OF WRITING | TOTAL CYCLES OF ERASE | NUMBER OF BAD BLOCKS | BAD BLOCK INCREASE RATE | AVERAGE ERASE TIME |
|---|---|---|---|---|---|---|
| 0 | 1000 | 4000 | 2000 | 2 | 0.001 | 3ms |
| 1 | 101 | 16000 | 2000 | 2 | 0.001 | 3ms |
| 2 | 102 | 30000 | 3000 | 2 | 0.0005 | 3ms |
| 3 | 103 | 3000 | 1000 | 1 | 0.001 | 3ms |
| 4 | 104 | 8000 | 2000 | 2 | 0.001 | 3ms |
| 5 | 1001 | 10000 | 20000 | 10 | 0.007 | 5ms |
| 6 | 1006 | 5000 | 1000 | 1 | 0.001 | 3ms |
| ● | ● | ● | ● | ● | ● | ● |
| ● | ● | ● | ● | ● | ● | ● |
| ● | ● | ● | ● | ● | ● | ● |
| | 801 | 802 | 803 | 804 | 805 | 806 |

FIG.9

900 READ/WRITE CYCLE MANAGEMENT TABLE

| # | LOGICAL VOLUME ID | LOGICAL DEVICE ID | RD CYCLES | WR CYCLES |
|---|---|---|---|---|
| 0 | 2 | 001 | 10000 | 10 |
| 1 | 3 | 002 | 2000 | 1100 |
| 2 | 4 | 004 | 5000 | 3000 |
| 3 | 5 | 006 | 500 | 10004 |
| ● | ● | ● | ● | ● |
| ● | ● | ● | ● | ● |
| ● | ● | ● | ● | ● |

1000 DEVICE TYPE MANAGEMENT TABLE

| # | STORAGE HIERARCHY DEVICE TYPE | POWER CONSUMPTION AMOUNT PER A CERTAIN TIME PERIOD | NUMBER OF ACTIVE DEVICES | NUMBER OF FREE LOW POWER CONSUMPTION DEVICE POOLS |
|---|---|---|---|---|
| 0 | FLASH | 300 | 50 | 500 |
| 1 | ATA | 2000 | 80 | 10000 |
| 2 | SCSI | 5000 | 600 | - |
| 3 | CACHE | 1000 | 4 | - |
| ••• | ••• | ••• | ••• | ••• |
| | 1001 | 1002 | 1003 | 1004 |

FIG.14

1400 GENERAL INFORMATION TABLE

| # | CONTROL APPARATUS ID | POWER CONSUMPTION AMOUNT PER A CERTAIN TIME PERIOD | NUMBER OF ACTIVE DEVICES (LOW POWER CONSUMPTION MEDIA) | TOTAL CAPACITY OF ACTIVE DEVICES (LOW POWER CONSUMPTION MEDIA) | NUMBER OF ACTIVE DEVICES (NORMAL POWER CONSUMPTION MEDIA) | TOTAL CAPACITY OF ACTIVE DEVICES (NORMAL POWER CONSUMPTION MEDIA) | NUMBER OF FREE LOW POWER CONSUMPTION DEVICE POOLS |
|---|---|---|---|---|---|---|---|
| 0 | 2 | 8000 | 50 | | 500 | | 1000 |
| 1 | 3 | 6000 | 80 | | 300 | | 500 |
| 2 | 4 | 5000 | 30 | | 400 | | 200 |
| 3 | 5 | 8000 | 40 | | 600 | | 1000 |
| ••• | ••• | ••• | ••• | ••• | ••• | ••• | ••• |
| | 1401 | 1402 | 1403 | 1404 | 1405 | 1406 | 1407 |

FIG.16

1600 USER-SPECIFIED REQUIREMENT TABLE

| # | CAPACITY | USER-SPECIFIED REQUIREMENT | SPECIFIED DEVICE TYPE |
|---|---|---|---|
| 0 | 500GB | WR: SMALL, RD:GREAT HIGH PERFOMANCE LOW POWER CONSUMPTION | |
| 1 | 700GB | WR: SMALL, RD:GREAT LOW PERFOMANCE LOW POWER CONSUMPTION | ATA |
| 2 | 200GB | WR: GREAT, RD:GREAT HIGH PERFOMANCE | SCSI |
| 3 | 1TB | WORM HIGH PERFOMANCE | |
| 4 | 300GB | SEQUENTIAL ACCESS LOW POWER CONSUMPTION | |
| ● | ● | ● | ● |
| ● | ● | ● | ● |
| ● | ● | ● | ● |

1601  1602  1603

WORM HIGH PERFOMANCE

FIG.18

1800 USER-SPECIFIED REQUIREMENT TABLE

| # | CAPACITY | USER-SPECIFIED REQUIREMENT PRIORITIES | | | DEVICE TYPE |
|---|---|---|---|---|---|
| | | 1 | 2 | 3 | |
| 0 | 500GB | WR: SMALL, RD: GREAT | LOW POWER CONSUMPTION | | |
| 1 | 700GB | WR: SMALL, RD: GREAT | PERFORMANCE | PERFORMANCE | |
| 2 | 300GB | LOW POWER CONSUMPTION | SEQUENTIAL ACCESS PERFORMANCE | LOW POWER CONSUMPTION | |
| ● | ● | ● | ● | ● | ● |
| ● | ● | ● | ● | ● | ● |
| ● | ● | ● | ● | ● | ● |

1900 DEVICE DETERMINING REQUIREMENT TABLE

| # | USER-SPECIFIED REQUIREMENT | FIRST CANDIDATE DEVICE TYPE FOR ALLOCATION |
|---|---|---|
| 0 | WR: SMALL, RD: GREAT<br>HIGH PERFOMANCE<br>LOW POWER CONSUMPTION | FM |
| 1 | WR: SMALL, RD: GREAT<br>LOW PERFOMANCE<br>LOW POWER CONSUMPTION | ATA |
| 2 | WR: GREAT, RD: GREAT<br>HIGH PERFOMANCE | SCSI |
| 3 | WORM<br>HIGH PERFOMANCE | FM |
| 4 | SEQUENTIAL ACCESS<br>LOW POWER CONSUMPTION | ATA |
| ● | ● | ● |
| ● | ● | ● |
| ● | ● | ● |

1901   1902

STORAGE SYSTEM OF STORAGE HIERARCHY DEVICES AND A METHOD OF CONTROLLING STORAGE HIERARCHY DEVICES BASED ON A USER POLICY OF I/O PERFORMANCE AND POWER CONSUMPTION

CROSS-REFERENCE TO RELATED APPLICATIONS

This is a continuation application of U.S. application Ser. No. 11/524,907 filed Sep. 22, 2006, now U.S. Pat. No. 7,549,016 issued Jun. 16, 2009 which is a continuation-in-part application of U.S. application Ser. No. 11/258,282 filed Oct. 26, 2005, now U.S. Pat. No. 7,568,075 issued Jul. 28, 2009, the subject matter of which is incorporated by reference herein. This application claims the benefit of Japanese Patent Applications 2005-275018 filed on Sep. 22, 2005 and 2006-227277 filed on Aug. 24, 2006, the disclosures of which are incorporated herein by reference.

BACKGROUND OF THE INVENTION

1. Field of the Invention

The present invention relates to a technology for reducing power consumption in a storage control apparatus for storing data in at least one hard disk device and other storage media. The present invention also relates to storage systems including a storage apparatus, in particular, a storage control apparatus or a tape library control apparatus for storing data on one or more disk devices or storage media; solid state disk devices such as optical disk library control apparatuses and silicon disk control apparatuses; and a storage apparatus using a plurality of storage control apparatuses or non-volatile memories such as flash memories.

2. Description of the Related Art

In recent information business scenes such as data centers, it has been considered more important to reduce TCO (Total Cost of Ownership) in a storage system (general terms for storage control apparatuses and hard disk devices, etc.) In addition, it has been required for secured data storage for a long term. For example, banking agencies and medical institutions in Japan are obliged to accumulate their document data without deleting them by laws such as the Personal Information Protection Law.

Based on this background, a storage system should be highly reliable with a large capacity. Generally, in a storage system having a larger capacity that uses hard disk drives (hereinafter referred to as HDD), power consumption increases in proportion to increase in capacity of storage media. Specifically, owning a larger capacity storage system leads to increase in TCO including electric charges.

In the view of the above disadvantages, an effective reduction in TCO over the storages system, especially in running costs represented by a power consumption amount can be achieved by adequately storing data to an appropriate storage locations, taking various requests on stored data into account when it is required to accumulate a large amount of information, if necessary, to store the data information in a long term.

By the way, great attention has recently been focused on flash memories as a non-volatile memory. Generally, a flash memory reduces power consumption by one several tenth in comparison with HDD, providing a high speed read. A flash memory can be compact because of free from a driving mechanism that is required for HDD, and has high endurance against faults in general.

However, a flash memory has a limitation on cycles of writing due to a physical property of cells for retaining information. To counter this limitation, a so-called ware leveling adjustment has been employed, in which a control is provided to maintain correspondence between cell locations and addresses which are indicated to higher level devices and to equalize cycles of writing to each cells, resulting in enhancement in rewritable cycles for the flash memory.

Hereinafter, a flash memory is used for an element to latch information, and a flash memory including mechanism for ware-leveling adjustment and protocol processing for higher-level devices is called as a "flash memory device". The element to latch information is called as a "flash memory".

Although the above scheme has enhanced efficiencies in limitation on cycles of writing for a flash memory device, with respect to distribution of storage area at an element level, there has been remaining limitation on cycles of writing for the flash memory device. The flash memory has a further disadvantage in that writing speed thereof descends to the same speed as that of HDD when it is necessary to erase data before writing new data.

In order to apply the flash memory with properties as mentioned above to a storage system, a scheme for storing data on an adequate storage location has been introduced, from the view point of writing performance and reliability or costs, as various requirements for stored data in conventional schemes, as disclosed in Document 1 (see Document 1 as below).

For the sake of realizing a storage system with a lower power consumption, schemes related to MAID (Massive Array of Idle Disks) have been introduced, as disclosed in U.S. Patent App. Pub. No. 2004/0054939 and Document 2 (see Document 2 as below).

However, since the scheme disclosed in Document 1 does not allow for account differences in cycles of rewriting, writing speed and power consumption between each storage medium, there have been difficulties to provide adequate control over the storage system. In the storage systems of U.S. Patent App. Pub. No. 2004/0054939 and Document 2, destinations to which the MAID can be applied are limited, so that there have been difficulties to keep a compromise between lower power consumption and maintaining of high performance of the system. Therefore, it has been requested to realize a computer system that achieves lower power consumption as well as high performance, so as to optimize the whole storage system. In particular, it has been requested to reduce power consumption, which is a crucial issue in a data center or the like, and ensure a higher access performance as well.

Document 1: John Wilkes, Richard Golding, Carl Staelin, and Tim Sullivan, "The HP AutoRAID hierarchical storage system", Transactions on Computer Systems (TOCS) archive, America, ACM (Association for Computing Machinery), February 1996, Volume 14, Issue 1, ISSN:0734-2071, Pages: 108-136

Document 2: Dennis Colarelli, Dirk Grunwald, and Michael Neufeld, "The Case for Massive Arrays of Idle Disks (MAID)", [online], Jan. 7, 2002, USENIX (U.S.A.), (Searched on Aug. 5, 2005)
<URL:http://www.usenix. Org/publications/library/proceedings/fa St02/wips/colarelli.pdf>

To solve the above problems, it is an object of the present invention to realize a successful balance between low power consumption and maintaining of high performance in a storage system.

SUMMARY OF THE INVENTION

According to an aspect of an apparatus of the present invention, there is provided a storage control apparatus includes a plurality of connecting units connected to at least one host computer and at least one hard disk drive as storage medium for storing data; at least one non-volatile storage medium that is of a different type from the hard disk drive and storing data that is WRITE requested from the host computer; processing units for processing WRITE and READ requests from the host computer by using the hard disk drives or the non-volatile storage media, and memory units storing control information used by the processing units.

In the storage control apparatus, one or plural hard disk drives are provided as a separate unit or part of a disk array device having control units; the control information stored in each of the memory units is a usage status management table that associates an individual identifier for each storage medium with the information on the usage status for each storage medium; each of the memory units further stores each threshold value for each information on the usage status; and each of the processing units inquires the usage status management table and each threshold value, both of which are stored in each memory unit, and migrating data in either type of the storage media which exceeds the threshold value to the other type of the storage media when any of the information on the usage status exceeds the threshold value thereof.

According to another aspect of the apparatus of the present invention, there is provided a data management method performed by at least one storage control apparatus including a plurality of connecting units connected to one or more host computers and one or more hard disk drives as storage media for storing data, one or more non-volatile storage media which are of a different type from the hard disk drives and which store data WRITE requested from the host computer, a plurality of processing units for processing WRITE and READ requests from the host computer by using the hard disk drive or the non-volatile storage medium and, and a plurality of memory units for storing control information to be used by the processing units.

The method includes steps of storing in each memory unit the information which is a usage status management table associating each identifier for each storage medium with information on the usage status of each storage medium; further storing in each memory unit each threshold value for the information on the usage status of each storage medium; inquiring on each processing unit the usage status table and each threshold value, both of which are stored in the memory unit, and migrating data stored in one of the storage media of either type whose usage status exceeds the threshold value for the usage status to one of the storage media of the other type if any of the information on the usage status of each storage medium exceeds the threshold value thereof.

According to further another aspect of the apparatus of the present invention, there is provided a storage control apparatus including a plurality of connecting units connected to one or more host computers and one or more disk drives as storage media for storing data; one or more non-volatile storage media which are a different type of storage media from that of the disk drives and which stores data WRITE requested from the host computer; a plurality of processing units for processing WRITE and READ requests from the host computer by using the disk drives or the non-volatile storage media, and a plurality of memory units.

In the storage control apparatus, the memory units includes a user-specification table for storing identification information on performance of storage media that a user specifies for data, a storage media management table for associating the storage media with performance thereof; and a usage status management table for associating an identifier for each storage medium with information on a usage status of each storage medium. the processing units inquire the user-specification table and determine a user-specification for the data, inquire the storage media management table and the usage status management table and select storage media having performance that satisfies the user-specification for the data, and store the data on the selected storage media Other aspect, features and advantages of the present invention will become apparent upon reading the following specification and claims when taken in conjunction with the accompanying drawings.

BRIEF DESCRIPTION OF THE DRAWINGS

FIG. 7 shows an example of a logical volume management table 700.

FIG. 8 shows an example of a usage status management table 800.

FIG. 9 shows an example of a read/write cycle management table 900.

FIG. 10 shows an example of a device type management table 1000.

FIG. 14 shows an example of a general information table 1400 for use in the case where the power consumption management is provided over the entire storage systems S, by use of the management terminal 601 described in FIG. 6.

FIG. 16 shows an example of a user-specified requirement table

FIG. 18 shows another example of a user-specified requirement table.

FIG. 19 shows an example of a device determining requirement table.

DETAILED DESCRIPTION OF PREFERRED EMBODIMENT

First Embodiment

With reference to the attached drawings, a detailed description will be given on a storage system S according to the first embodiment of the present invention as follows.

Figure 1:
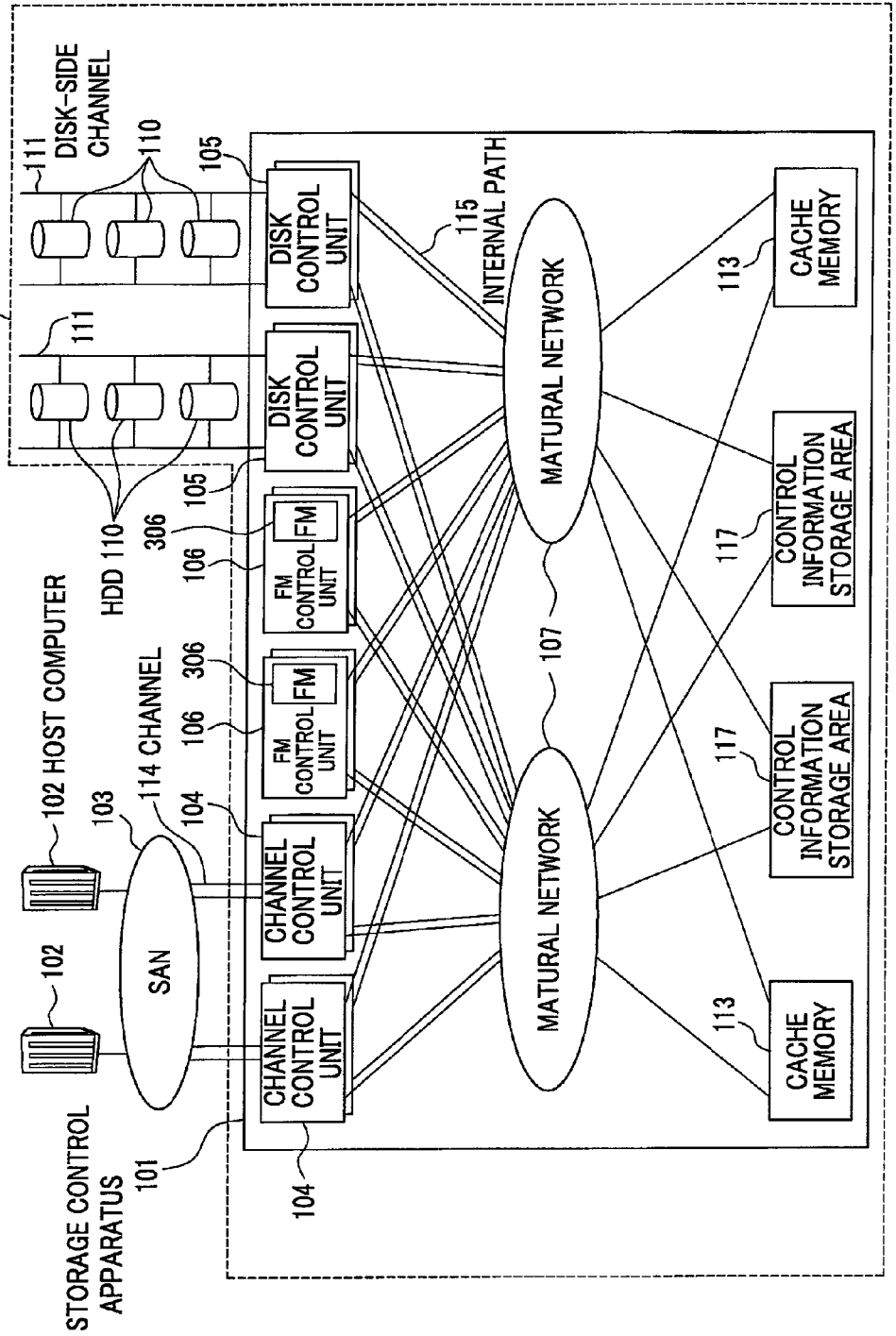
FIG. 1 is a block diagram showing an outline of a configuration according to an embodiment of the present invention including a storage system S.

FIG. 1 is a block diagram showing an outline of a configuration of an embodiment of the present invention including a storage system. The storage system S comprises a storage control apparatus 101 and HDDs (hard disk drives) 110. The storage control apparatus 101 is connected through channels 114 via SAN (storage Area Network) 103 comprising SAN switches to one or plural host computers 102 (two in the drawing).

The storage control apparatus 101 is also connected to a plurality of HDDs 10 for storing data through disk-side channels 111. The storage control apparatus 101 comprises a plurality of channel control units (connecting units) 104, a plurality of cache memories (memory units) 113, control information storage areas (memory units) 117, a plurality of disk control units (connecting units) 105, a plurality of FM control units 106, and a matural network 107 inter-connecting to the above components via internal paths 115.

The channel control unit 104 receives an I/O request from the host computer 102 through the channels 114, and interprets the request type of the I/O request such as a REAR/WRITE request for reading or writing data onto a HDD 110 or its object address so as to execute an appropriate process for the request.

The cache memory 113 temporarily stores data to be stored on a flash memory 306 (non-volatile storage medium: described later) within the HDD 110 and an FM control unit 106 or data to be sent to the host computer 102. The control information storage area 117 is an area for storing control information on the storage system S, which comprises memories such as RAM (Random Access Memory).

The cache memory 113 and the control information storage area 117 may be separately used by preparing physically different memories depending on the type of information to be stored, or by allocating logically different area thereto.

The disk control unit 105 provides a control for the HDD 110 through the disk-side channel 111 in response to a request from the channel control unit 104, and performs data acquisition or data storage for which the host computer 102 requests. At this time, the disk control unit 105 may provide control for the HDDs 110 according to RAID (Redundant Arrays of Inexpensive Disk: a scheme for managing a plurality of HDDs), so as to enhance reliability, availability and performance of the storage system S.

The FM control unit 106 provides control for the flash memory 306 (further details in FIG. 3) or for a flash memory device (further details in FIGS. 4 and 5) within the storage system S. The FM control unit 106 acquires or stores data storage requested by the host computer 102 in the flash memory 306 or the flash memory device, in response to the request from the channel control unit 104, etc. At this time, the FM control unit 106 may provide RAID control for the flash memory device, so as to enhance reliability, availability and performance of the storage system S. In the first embodiment, although the storage system S connects to the HDD 110, the system S may omit the HDD 110 and the disk control unit 105.

Figure 2:
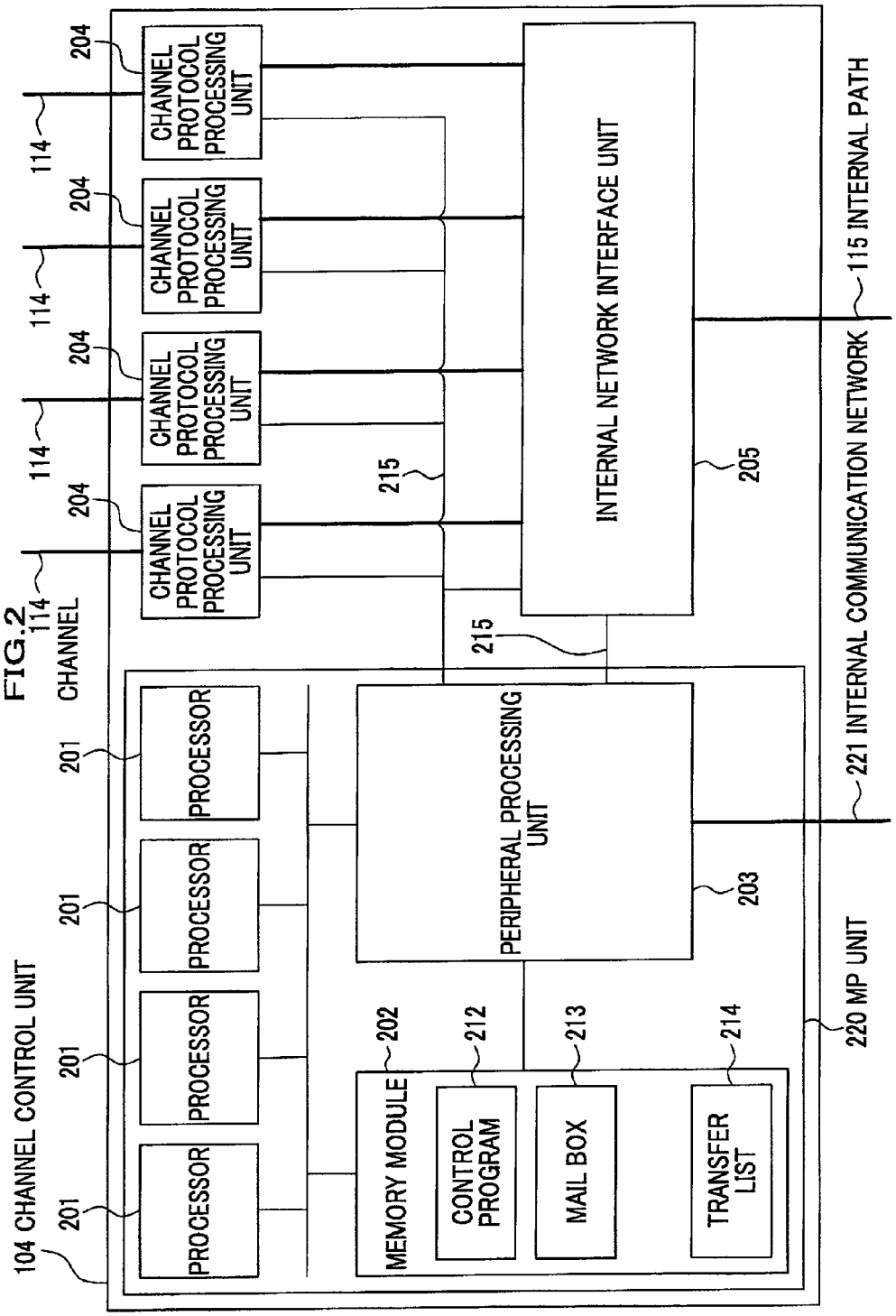
FIG. 2 is a block diagram showing a configuration of a channel control unit 104.

Next, a description will be given on a configuration of the channel control unit 104, with reference to FIG. 2 (see FIG. 1 if necessary). FIG. 2 is a block diagram showing the configuration of the channel control unit 104. The channel control unit 104 comprises a MP (micro processor) unit (processing unit) 220, a plurality of channel protocol processing units 204 and an internal network interface unit 205. The MP unit 220 includes a plurality of processors 201, a memory module 202 and a peripheral processing unit 203.

Each processor 201 is connected to the peripheral processing unit 203 by connection media such as bus. The peripheral processing unit 203 is connected to the memory module 202 so as to provide a control for the memory module 202. The peripheral processing unit 203 is also connected through a bus 215 of a communication system to the channel protocol processing units 204 and to the internal network interface unit 205.

The peripheral processing unit 203 receives packets (data) from the processor 201, the channel protocol processing units 204 and the internal network interface unit 205 to which the peripheral processing unit 203 is connected. If a transfer destination address indicated by the received packet is stored on the memory module 202, an appropriate process acceding to the address is performed, and returns the data to the internal network interface unit 205, if necessary. The peripheral processing unit 203 performs a data forwarding (data transfer) if the transfer destination address is an address of a location other than the memory module 202. The peripheral processing unit 203 is connected to another unit of the storage control apparatus 101 such as the disk control unit 105, via an internal communication network 221 such as LAN (Local Area Network) (further details in FIG. 6).

The memory module 202 has a mailbox 213 for communication between the processors 201 connected to the peripheral processing unit 203. The processor 201 makes an access to the memory module 202 through the peripheral processing unit 203, and provides an appropriate process in accordance with control programs 212 stored in the memory module 202.

The memory module 202 stores a transfer list 214 which the channel protocol processing units 204 use when performing DMA (Direct Memory access: a scheme for data transfer not via the processor 201). The channel protocol processing unit 204 provides a protocol control over the channels 114, and converts data from the host computer 102 into a protocol format so that it can be processed within the storage system S. Specifically, when receiving an I/O request from the host computer 102 via the channel 114, the channel protocol processing unit 204 notifies the processor 201 of a host computer number, LUN (Logical Unit Number: an identifier for a logical unit of HDD 110, a storage area corresponding to the Logical volume ID 701 in FIG. 7) or an access destination address for the I/O request.

In response to the notification from the channel protocol processing unit 204, the processor 201 accesses to directory information on the control information storage area 117 or the directory information which has been copied and expanded on the memory module 202. If there exists an address to which the I/O requested data must be stored or the I/O requested data itself in the directory information, the processor 201 creates the transfer list 214 on the memory module 202. Based on the transfer list 214, the channel protocol processing unit 204 provides a data transfer.

If READ requested data does not exist on the cache memories 113 but is stored on the HDD 110, the processor 201 directs the disk control unit 105 to store the data onto the cache memories 113 (this operation is called as "staging"), and then transfers the data based on the transfer list 214.

If the data READ requested from the host computer 102 is stored on a flash memory (such as the flash memory 306: described later in FIGS. 3 to 5), the processor 201 sets the address for the flash memory in the transfer list 214. The transfer list 214 is a list for addresses on the cache memories 113 or the flash memories.

When receiving a WRITE request from the host computer 102, the channel protocol processing unit 204 writes the data requested from the host computer 102 into a location corresponding to the address in the transfer list 214 through the internal network interface unit 205 via the internal path 115. When receiving a READ request from the host computer 102, the channel protocol processing unit 204 reads the data from the corresponding address appeared in the transfer list 214, and then returns the data to the host computer 102.

The internal network interface unit 205 serves as an interface for an internal communication between the channel control unit 104 and another storage system S via an internal path 115.

Although the disk control unit 105 has approximately the same configuration as that of the 104, the disk control unit 105 has a different part from that corresponding to a control program 212 and a part corresponding to the channel protocol processing units 204 for communicating with the HDD 110.

Note that the channel 114 and the disk-side channel 111 may have a different protocol from each other. However, the part in the disk control unit 105 corresponding to the channel protocol processing unit 204 is similar to the channel protocol processing unit 204 in the channel control unit 104, with respect of providing a protocol process on the disk-side channel 111 so that the process can be performed within the storage system S.

If there exists data on the cache memory 113, the processor 201 writes the data on the cache memory 113 into the HDD 110 according to a request from the channel control unit 104 or in a constant time cycle. If there is not data in the cache memory 113, the processor 201 receives a direction from the channel control unit 104, and then reads data from the HDD 110 and writes the data into the cache memories 113, according to this direction.

The processor 201 accesses to directory information stored on the control information storage area 117 so as to search for a memory address for the cache memory 113 which the data requested from the host computer 102 is to be read out of or to be stored in.

When the requested data is not on the cache memories 113, or when storing existing data onto the HDD 110 for the sake of creating a free space area (this operation is called as "destaging"), the disk control unit 105 controls the HDD 110 through the disk-side channel 111. At this time, the disk control unit 105 may provides RAID control for the HDD 110 group so that availability and performance over the entire HDD 110 can be enhanced.

Figure 3:
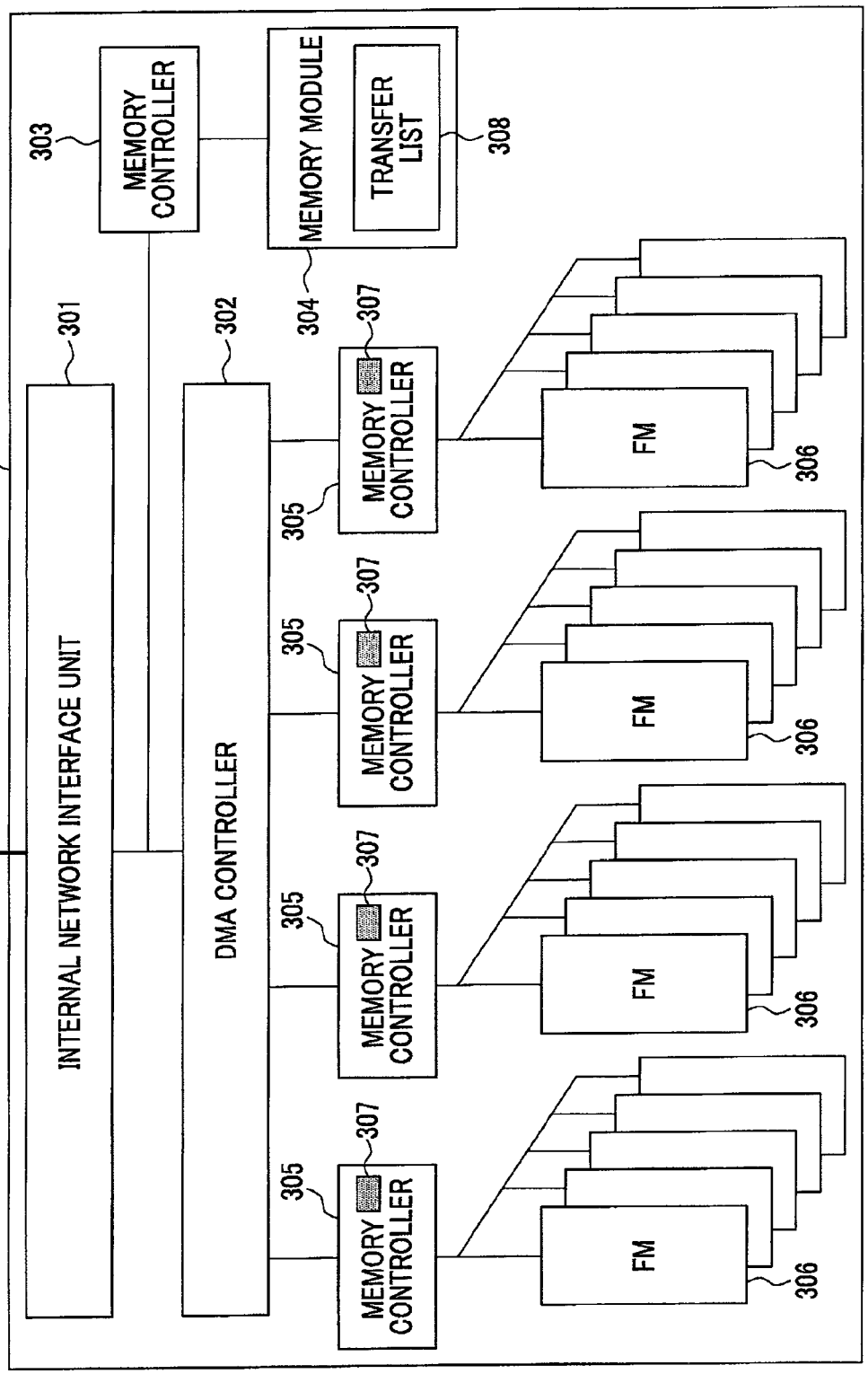
FIG. 3 is a block diagram showing a configuration of a FM control unit 106.

With reference to FIG. 3, a description will be provided on a configuration of the FM control unit 106 (see FIGS. 1 and 2 if necessary). FIG. 3 is a block diagram showing the configuration of the FM control unit 106. The FM control unit 106 comprises an internal network interface unit 301, a DMA controller 302 for providing DMA control, a memory module 304 of a non-volatile memory, a memory controller 303 for controlling the memory module 304, flash memories (FM) 306 as non-volatile storage elements, and memory controllers 305 for controlling the FM 306.

The internal network interface unit 301 serves as an interface for an internal communication between the FM control units 106 and another storage control apparatus 101 via the internal path 115.

The memory module 304 has a transfer list 308 for performing DMA in the FM control unit 106.

A DMA controller 302 included in the FM control unit 106 provides a data transfer from the cache memory 113 to the FM 306 according to the transfer list 214 set by the processor 201 of the channel control unit 104, for the sake of creating free capacity in the cache memory 113, for example, when processing the WRITE request from the host computer 102.

The memory controller 305 provides control for the FM 306 and handles data, in accordance with a READ request from the channel control unit 104 and a WRITE request by the DMA controller 302 via the internal path 115. The memory controller 305 stores information on usage of the FM 306 on the storage area 307 thereof. The information stored on the storage area 307 is used for creating a usage status management table 800 (described later in FIG. 8).

Instead of using the FMs 306, other memories may also be used, such as ferroelectric memories (non-volatile memory using ferroelectric material: FeRAM (Ferroelectric Random Access Memory)) or phase change memories (a non-volatile memory for storing data by using change in its amorphous state (i.e. phase change) such as OUM (Ovonic Unified Memory)).

Figure 4:
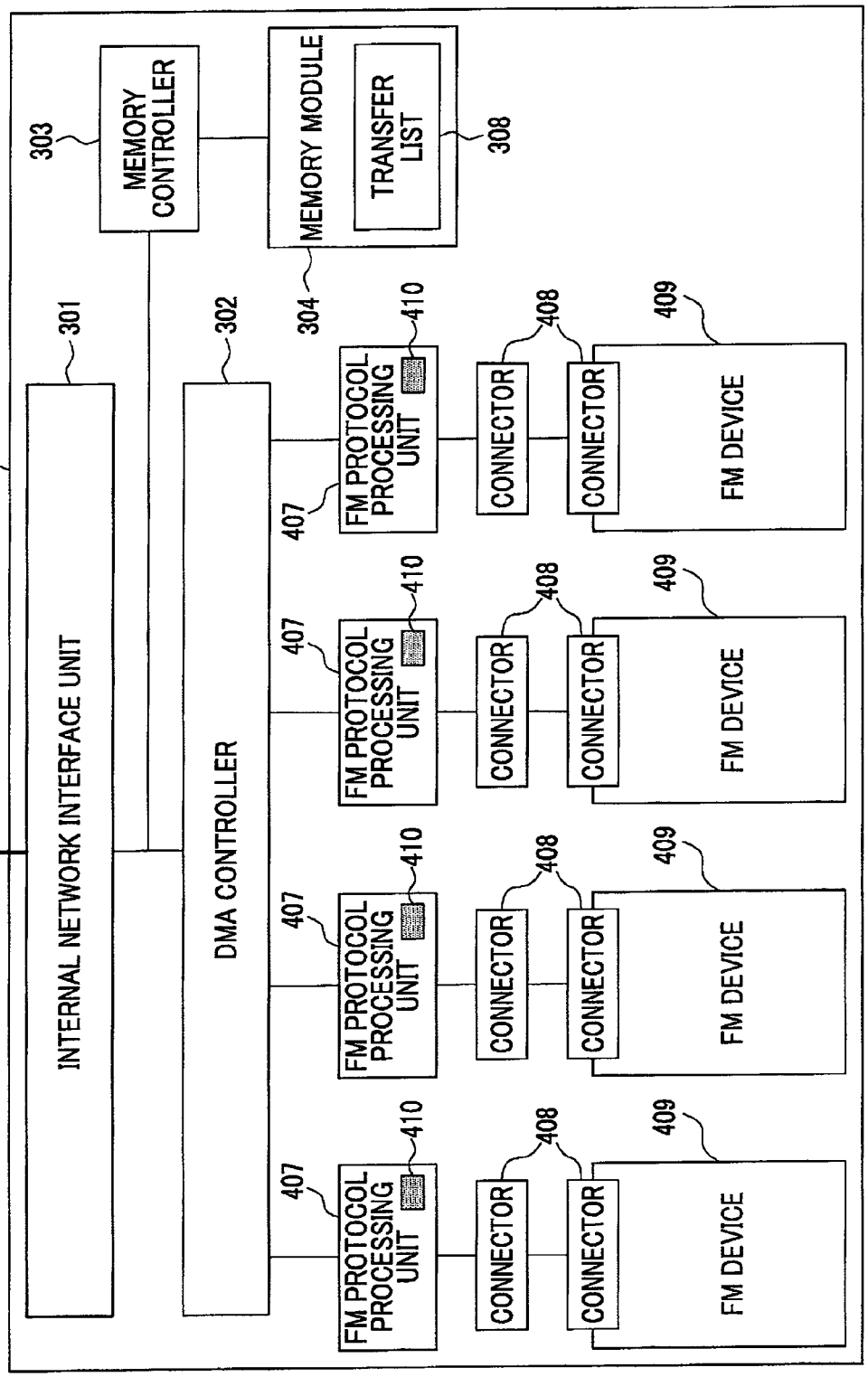
FIG. 4 is a block diagram showing another configuration of the FM control unit 106.

With reference to FIG. 4, a description will be given on another configuration of the FM control unit 106 in FIG. 3 (see FIG. 1 to FIG. 3). FIG. 4 is a block diagram showing another configuration of the FM control unit 106. This FM control unit 106 uses a flash memory (FM) device 409. Descriptions will be omitted on the same configurations by using the same references as in FIG. 3.

The FM device 409 is a storage system comprising a flash memory or flash memories similar to the FMs 306 in FIG. 3, a memory controller or controllers 303, and a communication means for communicating with FM protocol processing units 407 (not shown in the drawing).

The FM device 409 is provided in each FM control unit 106, as show in FIG. 4, and is detachably connected to the FM control unit 106 via connectors 408. Thus, the replacement of the FM device 409 is facilitated when the device 409 becomes in trouble. For the convenience of replacement of the FM device 409, the processor 201 of the channel control unit 104 may set the transfer list 214 such that a redundant configuration is shared between each FM device 409.

The above configuration also allows the FM device 409 itself to be replaced with another one having a larger capacity. Communication with the FM device 409 is performed through a general purpose protocol such as FFS (Fast File System). Therefore, the FM protocol processing units 407 converts a format for communication with the FM device 409 to be usable within the storage control apparatus 101.

The FM protocol processing unit 407 stores information on the usage of the FM device 409 in a storage area 410, and the information stored on the storage area 410 is used for creating the usage status management table 800 (described later in FIG. 8).

Figure 5:
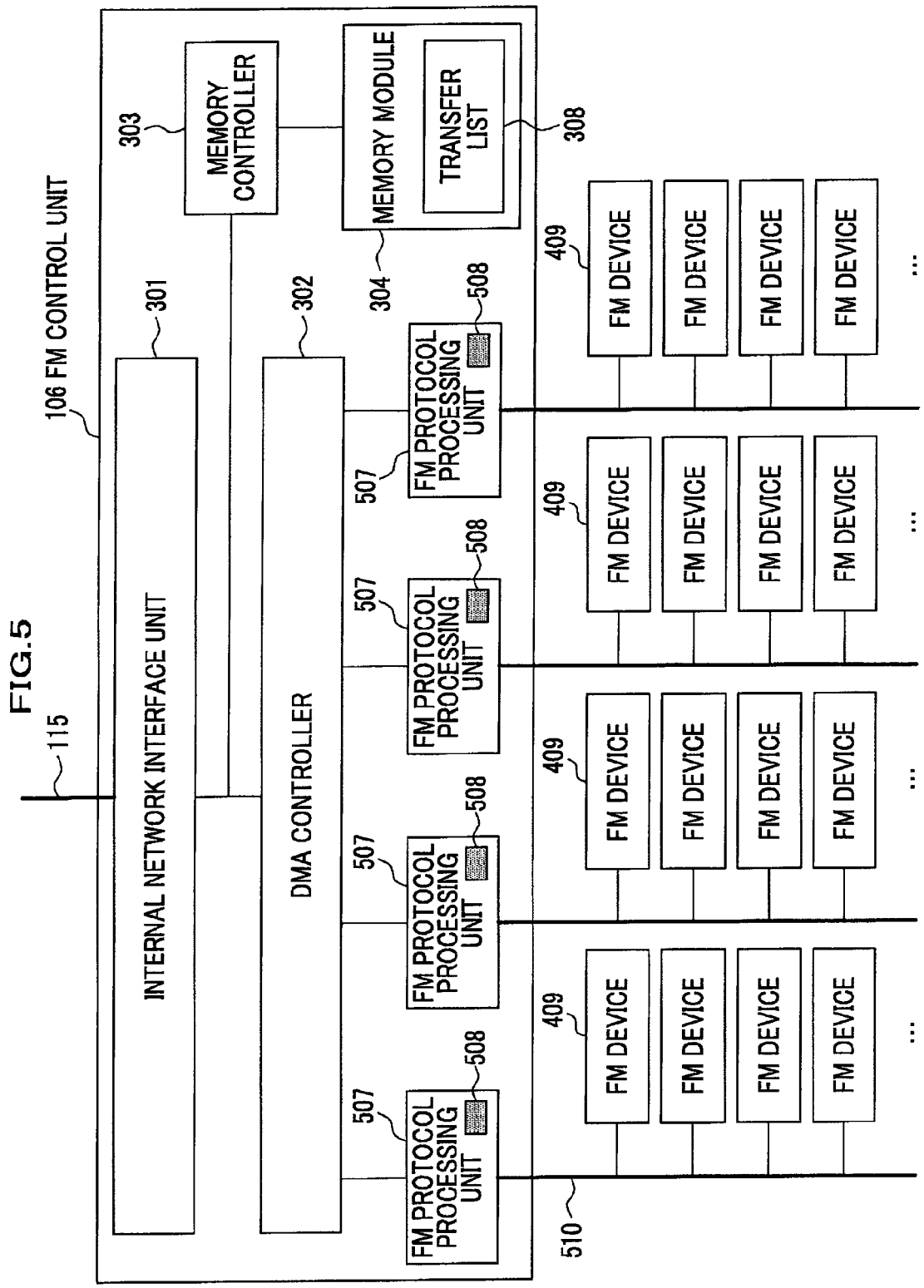
FIG. 5 is a block diagram showing further another configuration of the FM control unit 106.

With reference to FIG. 5, another configuration of the FM control unit 106, different from those in FIGS. 3 and 4, will be described as follows (see FIGS. 1 to 4). FIG. 5 is a block diagram showing another configuration of the FM control unit 106. MF-side channels 510 establish connections to the FM devices 409. Descriptions will be omitted on the same configurations by using the same references as in FIG. 3 or FIG. 4.

FM protocol processing units 507 serve similarly as the FM protocol processing units 407 do, and store information on the usage status of the plurality of FM devices 409 connected thereto in its storage area 508. The information stored on storage area 508 is used for creating the usage status management table 800 (described later in FIG. 8).

This configuration not only brings the features on the FM control unit 106 described in FIG. 4, but also allows more FM devices 409 to be connected to the FM control units 106, resulting in realization of a storage system S with a large capacity.

As for an implementation of the FMs 306 in FIG. 3, they may be disposed directly on the substrate. In this case, the connectors 408, the FM protocol processing units 407 and the FM-side channels 510 can be unnecessary, whereby a more compact storage system S is realized.

Furthermore in FIG. 3, each memory controller 305 can provide a ware leveling adjustment for the FM 306 thereof. The memory controller 305 may collect statistic information on the number of erase error occurrences and of bad blocks occurred when accessed to the FM 306, and stores the information on part of the FM 306, or in another FM 306 separately provided, where any means may be provided so as to send this statistic information according to a request from the processor.

Figure 6:
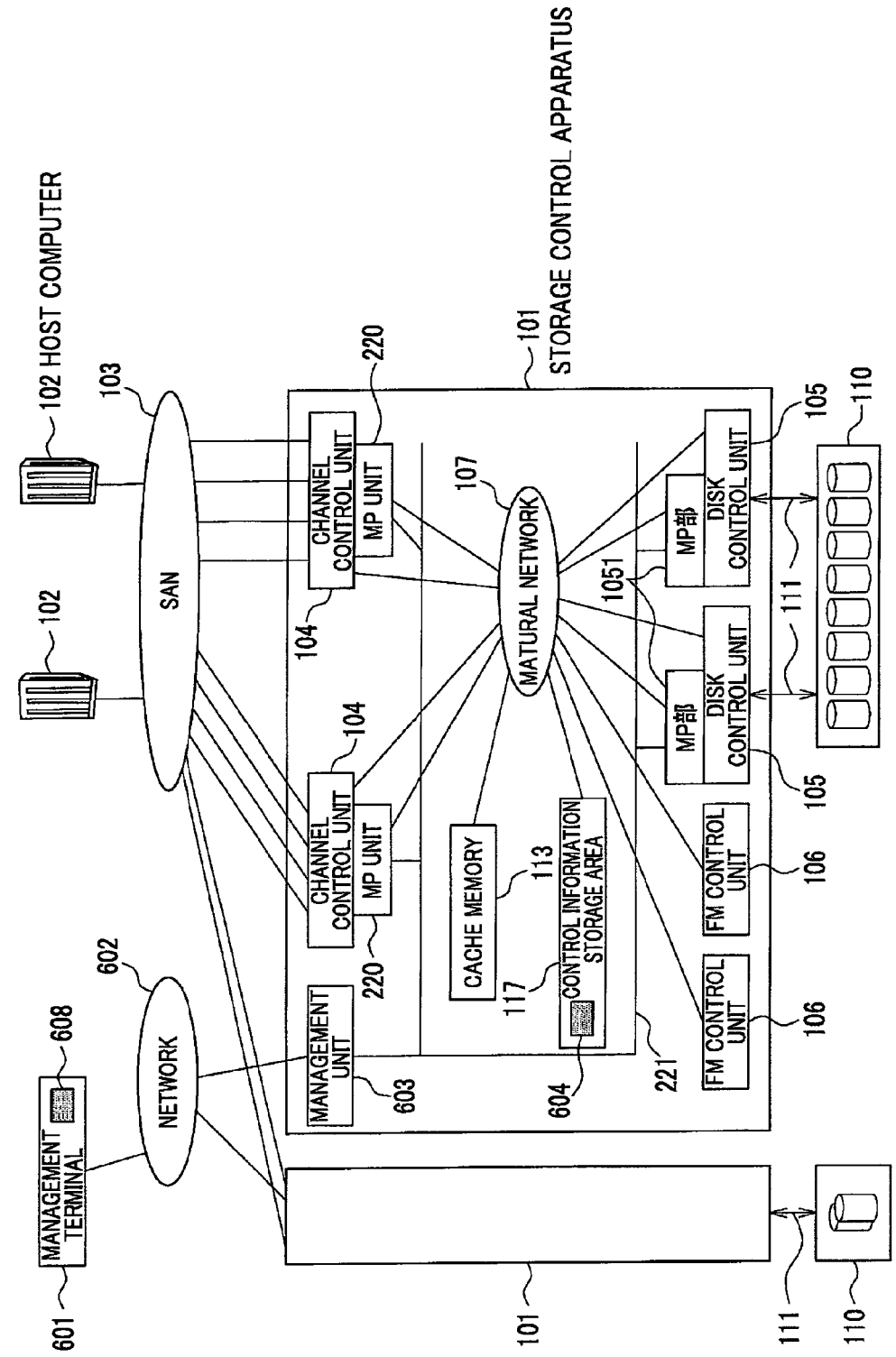
FIG. 6 shows an information flow in an illustrative example of a general configuration in which a plurality of storage control apparatuses 101 are provided.

Next, referring to FIG. 6, an explanation will be given on an information flow in the storage control apparatus 101 and other components (see FIG. 1 if necessary). FIG. 6 shows an information flow in an illustrative example of a general configuration in which a plurality of storage control apparatuses 101 are provided. Descriptions will be omitted on the same configurations by using the same references as in FIG. 1.

A plurality (two in FIG. 6) of storage control apparatuses 101 are connected to a management terminal 601 via a network 602.

The management terminal 601 may be a common server, serving for collecting internal information from one or plural storage control apparatuses 101, and integrally managing this internal information such as performance and power consumption amount (which may be a conversion value calculated by the number of components in operation based on the basic power consumption amount of each component in the storage control apparatus 101), or statistic information on failure information (further details in FIG. 8 to FIG. 10)

Specifically, the management terminal 601 has a management terminal processing unit (not shown in the drawing) such as CPU (Central Processing Unit) and a management terminal storage unit (not shown in the drawing) such as hard disk drives. The management terminal 601 accesses, via a common communication network 602 as a means for collecting information, through the management unit 603 provided in each storage control apparatus 101, to the information stored in the storage control apparatus 101, e.g. the device internal information 604 such as the usage status management table 800 in FIG. 8 stored on the control information storage area 117, or acquires the information 604 through the management unit 603. The management terminal 601 creates information 608 (e.g. general information table 1400 in FIG. 14) based on the device internal information 604 collected from each storage system 101.

Within the storage control system 101, there exists a MP unit 220 in each channel control unit 104 and a MP 1051 in each disk control unit 105, respectively. There also exists an internal communication network 221 for communication between the MP units 220 and 1051, or between the MP units 220, 1051 and the management unit 603.

The management unit 603 can make a direct or indirect access to information collected by each MP unit 220 and 1051, or the device internal information 604 such as configuration information and statistic information which are accumulated in each cache memory 113 or the like.

The management terminal 601 collates the collected information with predetermined criteria (threshold values), so as to provide an appropriate operation depending on the content of the information. Further description will be given on performances and processes within the management terminal 601, following an explanation on an example of control within the storage control apparatus 101.

With reference to FIG. 7, a description will be provided on a device management table for HDD 110 (hereinafter referred to as device as well) (see FIG. 1 if necessary). FIG. 7 shows an example of the device management table 700. Specifically, it explains how to provide management for each storage device (such as control information storage area 117) within the storage control apparatus 101 by using a logical volume management table 700, and management of a logical volume (equivalent to aforementioned Logical Unit) as an example of access objects visible to the host computer 102.

Although an access for each block by the host computer 102 will be explained here as an example, an access for each file by the host computer 102 can also be considered in the same way, because control at the lowest storage hierarchy is carried out by device including various storage media (HDD 110 and flash memories, etc.)

Specifically, substituting for SAN 103, it is possible to use another network such as the Internet in use by NAS (Network Attached Storage: a computer dedicated as a file server used in direct connection to a network).

When the host computer 102 performs a write operation to the HDD 110, the write access is performed not to a device ID as a physical identifier for the HDD 110, but to a logical volume ID as an identifier for the logical volume.

As shown in FIG. 7, in the logical volume management table 700, a logical volume ID 701 is an identifier for a logical volume, which is associated with a logical device ID 702, an identifier for a logical device of HDD 110 within the storage control apparatus 101. The logical device ID 702 is also associated with a virtual device ID 703, that is, an identifier for a virtual device.

The virtual device ID 703 is associated with a device ID 704 which is an identifier for an actual (physical) device and a device extent 705 indicating a space area within the device. The device extent 705 is a management unit for an area where a certain data amount can be stored. According to the embodiment of the present invention, the specific value for the data amount has nothing to do with the essence of the present invention; therefore, this data amount has no limitation.

The virtual device ID 703 is defined as an aggregate storage area for devices represented by one or a plurality of devices ID 704.

Note that the logical volume management table 700 is allocated on such a location (e.g. control information storage area 117) where all the processors (MP units 220, 1051) can inquire the management table 700 directly or indirectly.

Next, the following is a description of a usage status management table for managing each device, with reference to FIG. 8. FIG. 8 shows an example of the usage status management table.

The usage status management table 800 manages information on property, attribute, usage status for each device associated with its own device ID 801 (corresponding to the device ID 704 in FIG. 7). Now, assumed that management is provided for storage media such as flash memories, total cycles of writing 802 and total cycles of erase 803 since the beginning of use, number of bad blocks 804, bad block increase rate 805 and average erase time 806 are associated with the device ID 801. Although not shown in the drawing, each threshold value for the individual information item is managed in the usage status management table 800, or in another table dedicated to management for the threshold values.

Each of the information and its threshold value are used for the management of the devices. For example, it can be determined that the service life of a device (such as the FM 306) is ending soon when the average erase time 806 of the device becomes longer.

Adding to the aforementioned information, other information such as the number of times of erase operation errors (cycles of erase errors) can also be managed for a help to determine the endurance of the device.

Note that it is necessary to constantly store the total cycles of writing 802 and the total cycles of erase 803 since the beginning of use, when initializing the device or changing the allocation of the device.

The usage status management table 800 can also provide management for other devices or storage devices than the FMs 306, to which MAID is applied using ATA (AT Attachment) disk drives or the like, in which cycles of usage (total cycles of writing and total cycles of erase), the number of total spin-up/-down times and error occurrence rate are essential to manage the endurance of the device.

For example, if the HDD 110 is constituted by SCSI (Small Computer System Interface) and ATA disk drives, or by ATA disk drives alone, the disk control unit 105 can control the ATA disk drives in its rotation and stop by using the MAID technology.

It is not only the HDD 110 alone, but also a disk array device (not shown in the drawing) equipped with HDD 110 and a control unit (s) (not shown in the drawing) that may be connected to the disk control unit 105. In this case, rotation and stop of the ATA disk drives can be controlled by the instruction of the disk control unit 105 and the MAID equipped to the control unit (not shown in the drawing). That is, the ATA disk drives are vulnerable on a hardware basis; therefore, it is preferable to manage the ATA disk drives in their endurance on the usage status management table 800, as the FM 306 is managed.

The usage status management table 800 is explained as an example of management for flash memories. However, in the case of ATA disk drives or a device to which the MAID is applied using the ATA disk drives, the usage status management table 800 may include total spin up/down times, total revolution time and error occurrence rate. Specifically, the usage status management table 800 has various information on the endurance of storage media and devices (total usage time, error occurrence rate, bad block increase rate, cycles of access, etc.), depending on the situation.

The usage status management table 800 is laid out on a location where all the processors (MP units 220, 1051) can inquire the table 800 directly or indirectly as the same case of the logical volume table 700.

Referring to FIG. 9, an explanation of a read/write cycle management table 900 (see FIG. 1 if necessary) will be given. FIG. 9 shows an example of the read/write cycle management table 900.

The read/write cycle management table 900 is associated with a logical volume ID 901 (corresponding to the logical volume ID 701), a logical device ID 902 (corresponding to the logical device ID 702), RD cycles (total cycles of reading) 903 and WR cycles (total cycles of writing) 904. The read/write cycle management table 900 is updated as statistic information every time an access is made to either of the logical volume ID 901 or the logical device ID 902.

The read/write cycle management table 900 is allocated at such a location where all the processors (MP units 220, 1051) can inquire the table 900 as the same case of the logical volume management table 700.

The read/write cycle management table 900 is used in a process in which a large data having more frequencies to be read than those to be written is migrated from the HDD 110 to a flash memory of which power consumption per a certain time period is less than that of a HDD (described later in FIG. 11 to FIG. 13).

Similarly, although there is nothing to do with the read/write cycle management table 900, data stored on a logical volume which is specified as WORM (Write Once Read Many), read-only, or a long term retention period, may be migrated (from HDD 110 to the FM 306).

Next, a description will be given on a device type management table as follows, with reference to FIG. 10 (see FIG. 1 if necessary). FIG. 10 shows an example of the device type management table.

The device type management table 1000 is associated with storage hierarchy device type 1001 indicating a device type, power consumption amount per a certain time period 1002, the number of active devices 1003 indicating the number of devices in operation, and the number of free low power consumption device pools (free capacity of storage media with low power consumption) 1400.

In the storage hierarchy device type 1001, "Flash" donates the FMs 306, "ATA" donates ATA disk drives which are the entire or part of HDD 110 used in a MAID scheme, ATA disk drives included by a disk array device using the MAID in the case where the disk array device is connected to the disk control unit 105, or a logical device (a logical volume) comprising ATA disk drives provided by the above mentioned disk array device. "SCSI" donates SCSI disk drives which is the entire or part of HDD 110. "Cache" donates a RAM in use as cache memories 113.

The number of free low power consumption device pools 1004 has a unit such as Mega byte (MB) and Giga byte (GB).

The total amount of power consumption for the storage control apparatus 101 can be obtained in measuring and recording methods by providing a measuring device for actual power consumption (e.g. power meter) at a power source unit (not shown in the drawing) thereof. To eliminate the measuring means such as a power meter, a rough estimate of the total power consumption amount may be calculated by use of the device type management table 1000.

In other words, since the storage control apparatus 101 monitors the operation status of each component, the rough estimate of the total power consumption amount can be obtained simply by managing the information in the device type management table 1000 as statistic information. In processes described later in FIG. 11A to FIG. 13, the device type management table 1000 can be used such that data is migrated to a lower power consuming device depending on the status of each component and its power consumption amount, so as to reduce the power consumption for each component.

Note that the device type management table 1000 is laid out at a location where all the processors (MP units 220, 1051) can inquire the table 1000 directly or indirectly as the same case of the logical volume table 700.

Furthermore, an explanation will be given on the operations of the storage system, referring to FIG. 11A to FIG. 13 (see FIG. 6 etc. if necessary).

Figure 11A:
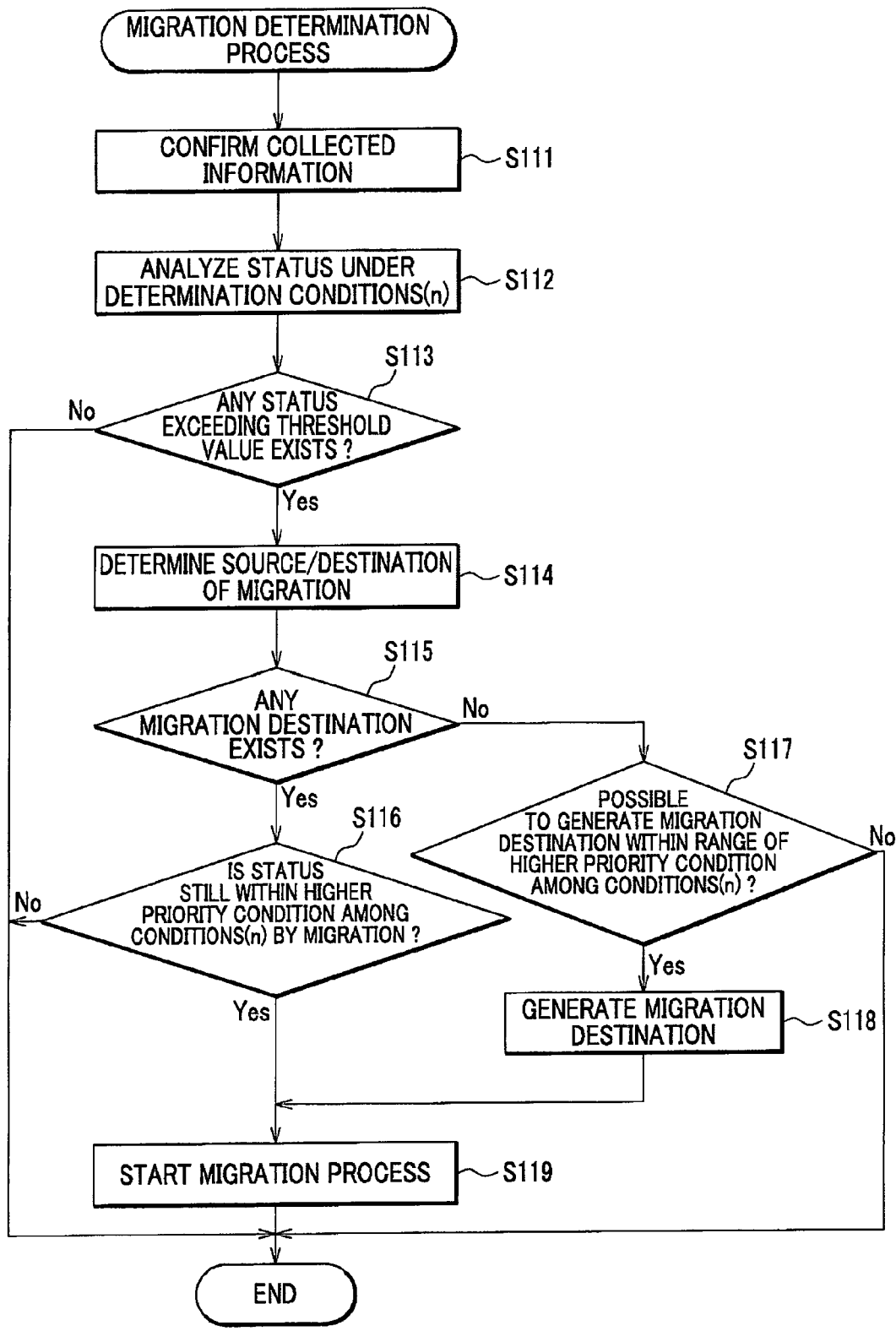
FIG. 11A is a flow chart showing an example of a determination process where the MP unit 220 provides a data migration between HDD 110 and a FM 306 in the FM control units 106.
Figure 12:
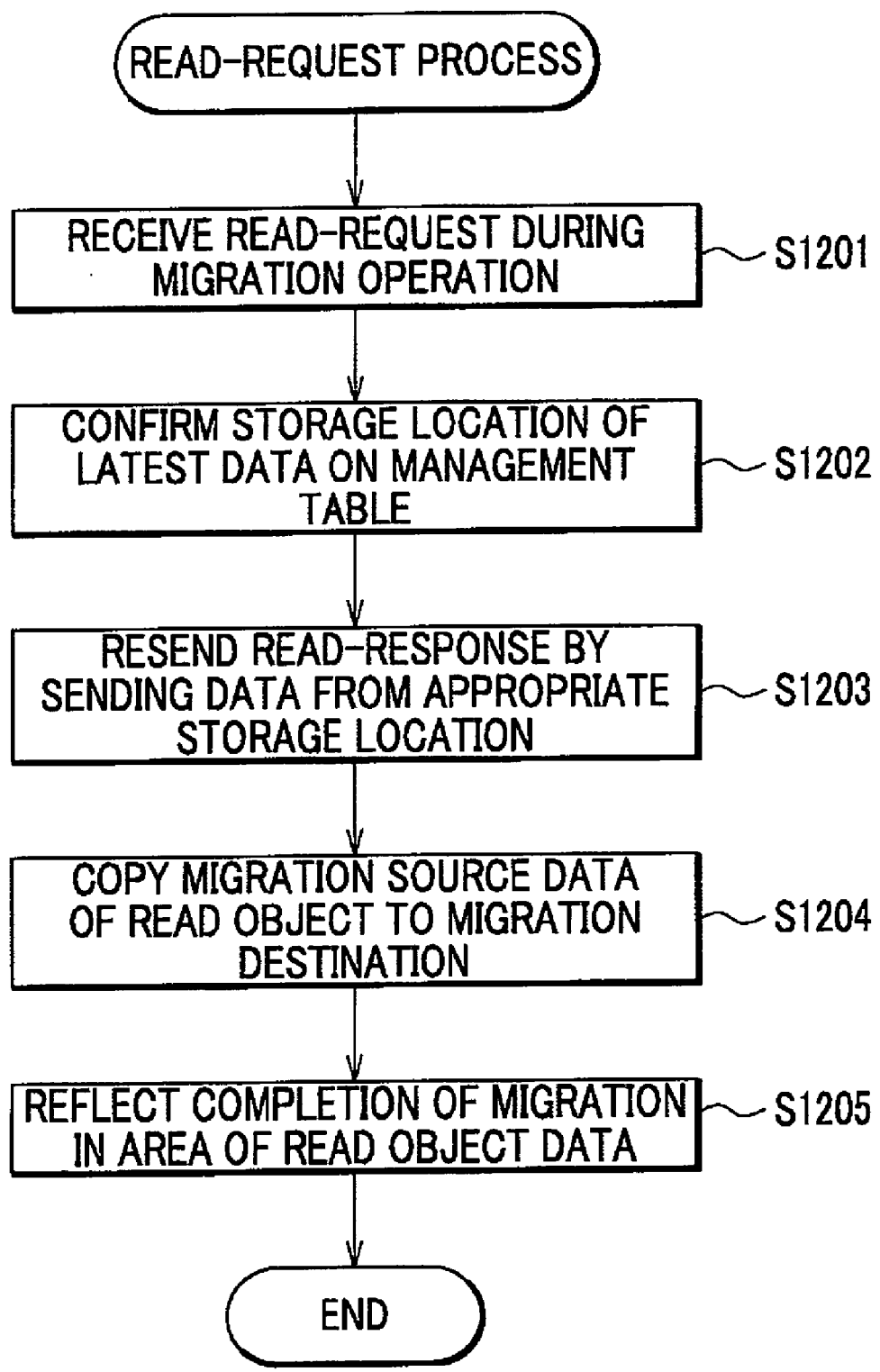
FIG. 12 is a flow chart showing an example of a process by the MP unit 220 when receiving a READ request from the host computer 102 during the data migration operation.

FIG. 11A is a flow chart showing an example of a determination process where the MP unit 220 provides a data migration between HDD 110 and the FM control units 106.

The timing when the MP unit 220 executes this data migration process is, for example, when receiving periodical READ/WRITE requests from the host computer 102, or when receiving a direction from the host computer 102 to specify a certain logical volume as WORM.

There have been shown three examples of the configuration for the FM control unit 106 in FIGS. 3 to 5. Now, the example of FIG. 3 will be explained.

The MP unit 220 makes a confirmation of collected information (each table in FIGS. 8 to 10) when executing the determination process for the data migration (S111).

Next, the MP unit 220 gives an analysis on the status based on the collected information and the determination conditions (n) (S112). The determination conditions (n) include, for example, a endurance management for the FM 306 (to determine whether the total cycles of writing exceed the predetermined value or not by inquiring the total cycles of writing 802), reduction in power consumption (to inquire the device type management table 1000), data migration due to a direction of WORM from the host computer 102, RD/WR cycles ratio (by inquiring RD cycles 903 and WR cycles 904, to determine a possibility of data migration to the FM 306 if the RD cycles 903 to the WR cycles 904 ratio exceeds the predetermined value). These determination conditions (n) are used in priority in combination with each other.

The MP unit 220 determines whether a status exceeding the threshold value exists or not, based on the analysis at the step S112 (S113). The step S113 is for determining whether the total cycles of writing of the FM 306 exceeds the threshold value or not, and if it exceeds the threshold value, data thereof is migrated to the HDD 110 having no limitation in cycles of writing.

If there is no status exceeding the threshold value ("No" at S113), the MP unit 220 completes the process.

If there exists any status exceeding the threshold value ("Yes" at S113), the MP unit 220 selects a source and a destination of the data migration (S114), and determine whether a destination of the data migration exists or not, by inquiring the number of free low power consumption device pools 1004, etc. (S115).

If there is no destination of the data migration ("No" at S115), the MP unit 220 determines whether it is possible to generate a data migration destination within the range of a certain condition in a higher priority among the determination conditions or not (S117).

Furthermore, if it is not possible to generate the destination of the data migration ("No" at S117), the MP unit 220 completes the process.

If it is possible to generate the destination of the data migration ("Yes" at S117), the MP unit 220 generates the destination of the data migration (S118), and starts the data migration process (S119).

To be specific, if an attempt is made to migrate data from the HDD 110 to any of the FMs 306, but there is no destination for the data migration in the FMs 306 (i.e. there is no free capacity), for example, part of the data on the FMs 306 may be migrated to the HDD 110 within the range of a certain condition in a higher priority (such as a condition relevant to power consumption) among the determination conditions (n), so as to generate some free capacity for the FMs 306, into which the data can be migrated.

If there exists the destination of the data migration exists ("Yes" at S115), the MP unit 220 determines whether the status exceeds a certain condition in a higher priority among the determination conditions (n) or not, due to the data migration (S116).

If the status exceeds the condition in a higher priority among the determination conditions (n) ("No" at S116), the MP unit 220 completes the process. For example, although the FMs 306 have no problems in their endurance due to the data migration, the MP unit 202 does not perform the data migration if the condition in a higher priority is not satisfied.

If the status does not exceed the condition in a higher priority among the determination conditions ("Yes" at S116), the MP unit 220 starts a process of the data migration (S119).

As described above, the data migration can be accomplished so as to optimize the total power consumption and the endurance management for the FMs 306 in the storage system S. Specifically, data migration to the FMs 306 with lower power consumption is performed depending on the frequencies of write/read of the device, so that reduction in the total power consumption can be achieved.

Figure 11B:
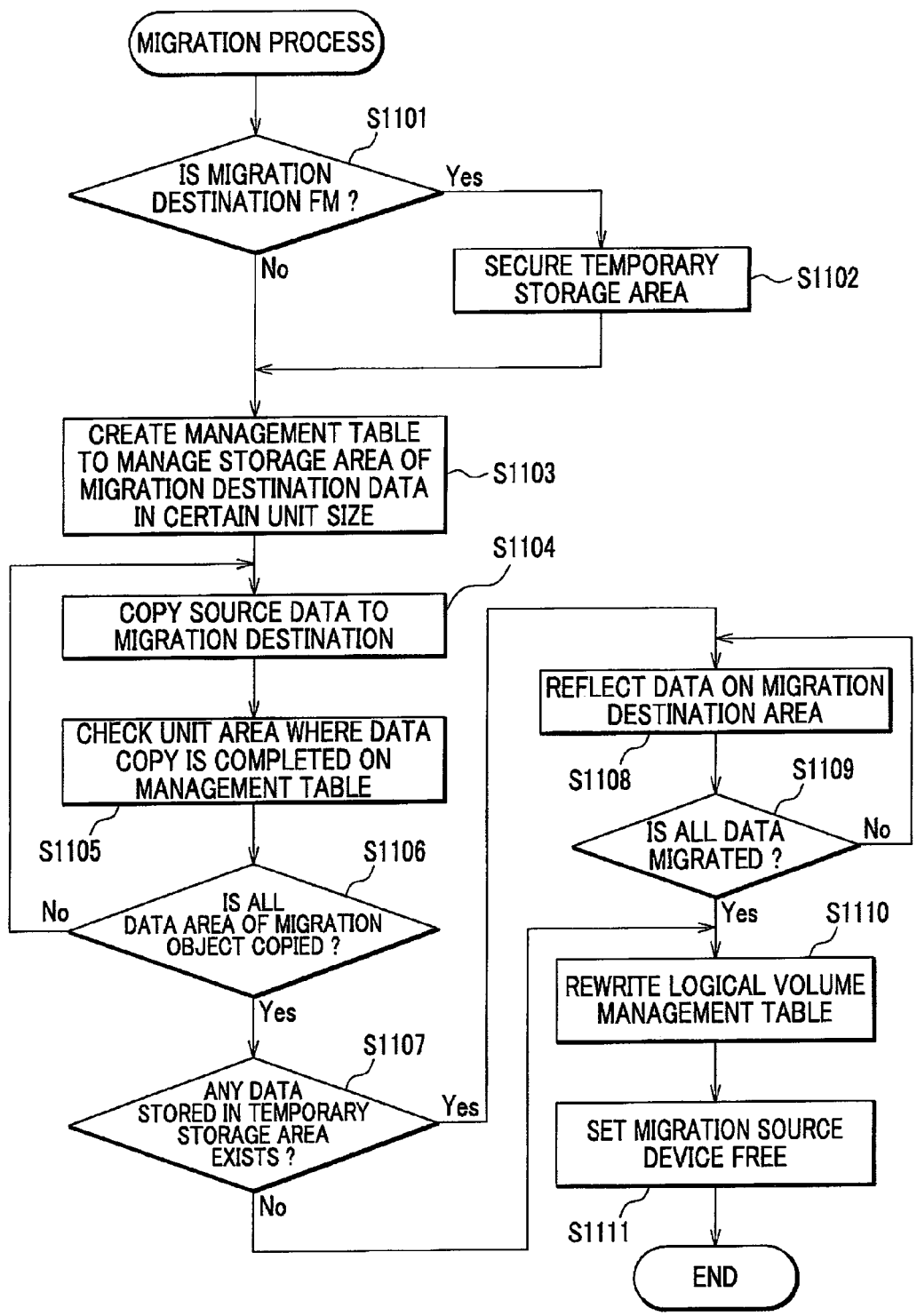
FIG. 11B is a flow chart showing an example of a determination process for performing data migration between the HDD 110 and the FM 306 in the FM control units 106.

Next, with reference to FIG. 11B, an explanation of a data migration process will be given (see FIG. 6, etc. if necessary). FIG. 11B is a flow chart showing an example of a determination process for performing data migration between the HDD 110 and the FMs 306 by the FM control units 106. Note that this step is performed after the step S119 in FIG. 11A.

First, the MP unit 220 determines whether the destination area is in the FMs 306 or not (S1101).

If the destination area is in the FMs 306 ("Yes" at S1101), a temporary storage area is secured in the HDD 110 since the FMs 306 are sensitive to cycles of writing and performance (S1102). At the same time, the MP unit 220 generates a temporary storage area management table in the control information storage area 117.

If the destination area is not in the FMs 306 ("No" at S1101), there is no necessity to secure the temporary storage area, hence, forwarding to the step S1103.

Then, the MP unit 220 creates a management table (not shown in the drawing) for managing the storage area of the data migration destination in a certain unit size (S1103). This management table, for example, may be a bit map table for managing the data in unit size of 64 KB. Any other tables than the bit map table can be used for this management table, as far as the management can be provided for the progress of the data migration.

Following the above steps, the MP unit 220 sends an direction to the DMA controller 302 to copy the original data to the destination of the data migration (S1104).

The MP unit 220 checks the area where the data migration is completed in accordance with the above-mentioned management table (i.e. the bit map table), for example, by changing the bit "0" to "1" (S1105).

The MP unit 220 determines whether the entire data area of the migration object has been copied according to the management table, that is, whether the progress of the data migration has reached 100% or not (S1106).

If the entire data area of the migration object has not been copied yet, the MP unit 220 repeats the processes at the step S1104 and the step S1105.

If the copying process for the entire data area of the migration object has been completed ("Yes" at S1106), the MP unit 220 forwards to the step S1107.

By the way, the storage control apparatus 101 occasionally receives READ and WRITE requests for the data during the migration process at the steps S1101 through S1106. An appropriate process in this case will be explained later in FIGS. 12 and 13.

Next, at the step S1107, the MP unit 220 inquires the temporary storage area management table created at the step S1102, and checks whether there exists any data stored on the temporary storage area or not.

If there exists any data stored on the temporary storage area ("Yes" at S1107), the MP unit 220 reflects the data stored on the temporary storage area on the migration destination area (S1108), and repeats the process at this step S1108 until the migration of the entire data has been completed ("Yes" at S1109).

If the there exists no data stored on the temporary storage area ("No" at S1107), the MP unit 220 proceeds to the step S1110.

The MP unit 220 rewrites the logical volume management table 700 in accordance with the data migration (S1110). In this case, for example, by changing the ID name in an appropriate cell for the device ID 704 in the table 700 from a migration source device ID to a migration destination device ID, it can be unnecessary to rewrite a virtual device in the host computer (corresponding to the virtual device ID 703).

The MP unit 220 sets the migration source device free that has become unnecessary at the step S1110, so as to reuse it in other purpose (S1111).

As explained above, the data migration can be accomplished in the storage system S, in accordance with the determination result on the migration as described in FIG. 11A.

There is another method such that a logical execution is made at the step S1111 prior to the actual operations of the data migration is carried out at the steps S1104 to S1106. This method can be applied not only to a data migration operation but also to a high-speed snap shot access feature among data replication features (generally referred to as a volume mirror-split or a snap shot). In the case of using this method, an appropriate change may be provided in the processes (for READ/WRITE requests) described later in FIGS. 12 and 13, according to each purpose.

Next, with reference to FIG. 12, an explanation will be given on a process by the MP unit 220 when receiving a READ request from the host computer 102 during the data migration operation (S1101 to S1106 in FIG. 11B) (see FIG. 6 if necessary). FIG. 12 is a flow chart showing an example of the process by the MP unit 220 in this case.

First, the MP unit 220 receives a READ request for data during the migration operation from the host computer 102 (S1201), and then makes a confirmation of the latest data storage location (in the migration source device or the temporary storage area) on the management table (created at S1103 in FIG. 11) (S1202).

Next, the MP unit 220 returns a READ response to the host computer 102, by sending the data from the appropriate storage location thereof (S1203).

Then, if the data migration of the READ object has not been completed yet, the MP unit 220 copies the migration source data to the migration destination (S1204).

The MP unit 220 reflects the completion of the operation in the area where data migration has been executed on the management table (S1205).

Note that the processes at S1203 and at S1204 may be performed prior to the process at S1202.

As described above, the storage system S can meet a READ request from the host computer 102 even while the data migration is being performed.

Figure 13:
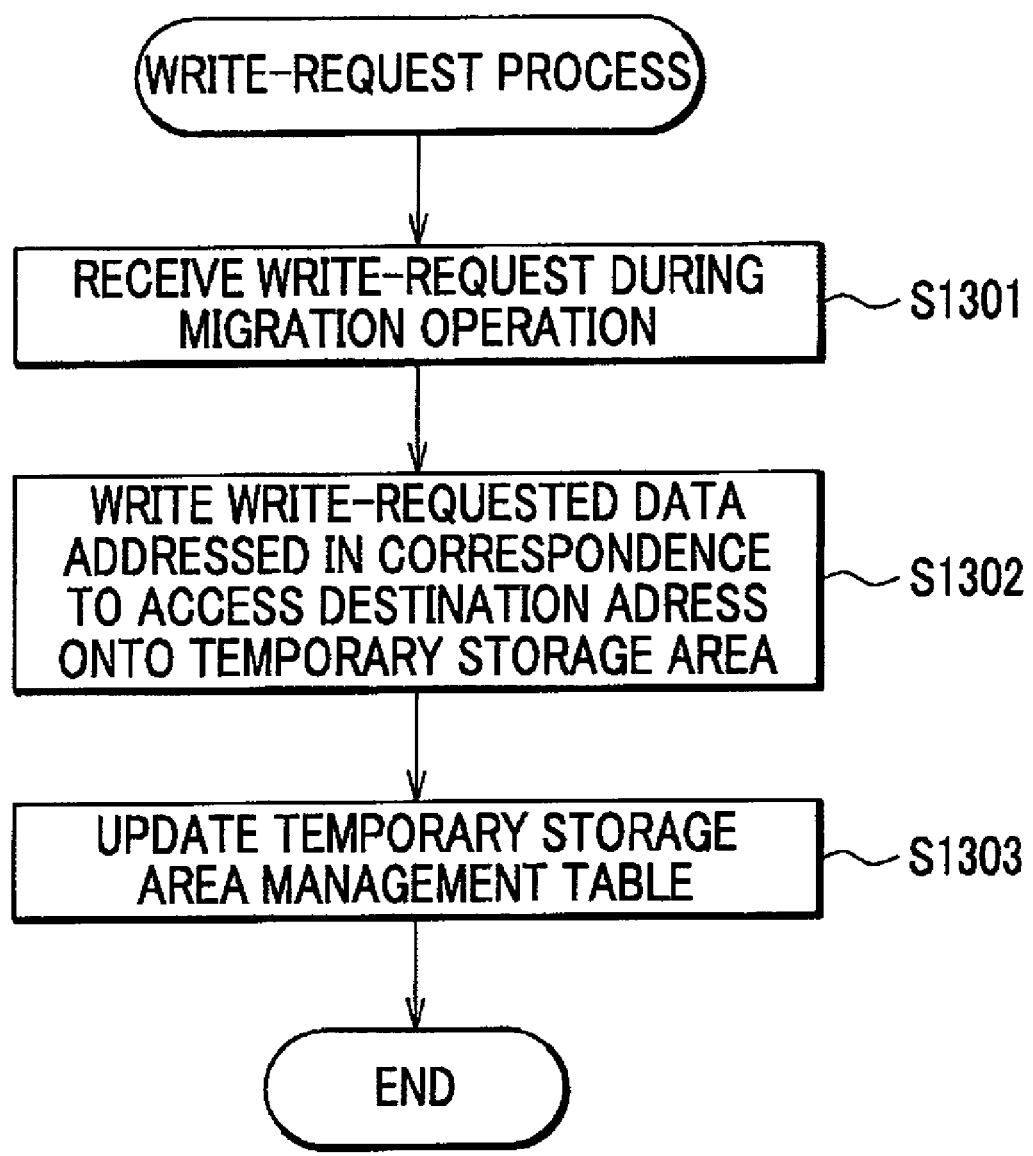
FIG. 13 is a flow chart showing an example of a process by the MP unit 220 when receiving a WRITE request from the host computer 102 during the data migration operation.

With reference to FIG. 13, an explanation will be given on a process by the MP unit 220 when receiving a WRITE request from the host computer 102 during the data migration operation (S1101 to S1106 in FIG. 11B) (see FIG. 6, etc. if necessary). FIG. 13 is a flow chart showing an example of the process by the MP unit 220 in this case.

First, the MP unit 220 receives a WRITE request for data during the migration operation from the host computer 102 (S1301), and then writes the WRITE requested data addressed in correspondence to its access address, into the temporary storage area (S1302).

Then, the MP unit 220 updates the temporary storage area table which has been created at the step S1102 in FIG. 11B, so as to reflect that the latest data is located in the temporary storage area (S1303).

As explained above, the storage system S can meet a WRITE request from the host computer 102 even while the data migration is being performed.

Furthermore, the data WRITE requested by the host computer 102 is temporarily stored on the temporary storage area, and then reflected later, so that a smooth data migration operation can be accomplished even if the migration destination is such a device as the FMs 306 in which a write is carried out by a complicated procedure such as adding, replacement of pointer and block erase, or as a device using ATA disk drives for dealing only a disk device requiring for repeated spin-up and -downs.

Although each process in FIGS. 11A to 13 is described to be performed by the MP unit 220, other features or means may be used for each process, such as DMA features directed by the MP unit 220 and MP unit 1051.

Now, another embodiment of the present invention will be explained (see FIG. 6, etc. if necessary), referring to FIG. 14. FIG. 14 shows an example of a general information table 1400 for use in the case that the management terminal 601 described in FIG. 6 provides a power consumption management for the entire storage systems S.

In the general information table 1400, a control device ID 1401 as an identifier for the storage control apparatus 101, power consumption amount 1402 per a certain time period in each storage control apparatus 101, active devices 1403 indicating the number of low power consumption media in operation such as the FMs 306, total capacity of active devices 1404 indicating the total capacity of low power consumption media in operation, active devices 1405 indicating the number of normal power consumption media such as HDD 110, total capacity of active devices 1406 indicating the total capacity of normal power consumption media in operation, and free low power consumption device pools 1407 indicating the number of free low power consumption devices are associated respectively.

Even if it is impossible to migrate data of a device with normal power consumption to another device with low power consumption within a certain storage control apparatus 101, this general information table 1400 enables the data to be migrated from the normal power consumption device to a low power consumption device within another storage control apparatus 101, whereby reduction in power consumption can be achieved over the entire storage systems S.

Note that threshold values for power consumption over the entire storage systems S are stored and managed in the general information table 1400 or in different tables dedicated to the management for the threshold values (not shown in the drawing).

The specific processes of the data migration are similar to those according to the flow charts in FIGS. 11A to 13. For example, the data migration process between devices within the same single storage control apparatus 101 shown in FIG. 11B may be executed between devices in different storage control apparatuses 101. Then the host computer 102 may be allowed to recognize changes of the access destination devices. Or it could be accomplished by the volume virtualization software on the host computer 102 or the virtualization switch to recognize the changes of the access destination devices.

Second Embodiment

Hereinafter, detailed descriptions will be given on a storage system S according to a second embodiment of the present invention, with reference to the attached drawings.

Note that, in the descriptions on the second embodiment, the same components as those in the first embodiment are denoted by the same numeral references of the first embodiment, and components of the storage system S that are not described in the second embodiment are substantially the same as those of the first embodiment of the present invention.

In the second embodiment, explanations will be given particularly on how to allocate data storing locations, which is one of functions performed in the management terminal 601 or the management unit 603. To be specific, the explanations will be given on how to perform processes of selecting data storing locations when a user specifies data attributes or data usage requirements.

Management programs, executed on the storage control device 101 or the control terminal 601, allocate data to optimum storage area for the data, in consideration of attributes provided to the data, policies specified by a user or a system administrator of the storage system, properties of actual accesses to the data, devices serving as storage area for the data, apparatuses, and conditions of performance/changes over time at a certain time in the entire system, etc.

Specifically, in connection with certain data, the programs determine performing conditions of devices, apparatuses and the entire system shown in FIGS. 8-10 and FIG. 14, on which information is constantly collected, in accordance with predetermined determining conditions. Based on the above determination of the conditions, the programs allocate optimum storage area that meets predetermined requirements and optimizes managements of power consumption or system endurance. This allocation process is executed when receiving data from the host computer 102 or when the user or the system administrator creates logical volumes, or in periodic time intervals.

Examples will be described of the determining conditions and of how to select allocation destinations in accordance with the determining conditions, as follows.

(1) Depending on the current usage status or histories, allocation control is provided on storage devices having write/erase endurance and device endurance shorter than those of others.

Specifically, if there are any storage devices having write/erase endurance almost reaching a predetermined threshold value, storage area for data is allocated to other devices having longer or unlimited endurance. For example, inquiring a management table described in the explanation on FIG. 8, if there are any devices having either of erase cycles, write cycles, bad block increase rate, average erase time, spin up/down cycles or total usage time that is reaching or that has reached the threshold vale, the devices are to be used as storage area for read priority data.

(2) Appropriate devices are allocated as storage area for data, depending on policies that the user or administrator specifies such as write/read frequencies, power consumption or performance.

For example, if it is determined and specified that read frequencies are significantly great, as shown in the entry #0 of FIG. 16 (described later), data is allocated to storage area such as flash memories of which read performance is much faster. Similarly, if data is specified to be stored on WORM (Write Once Read Many) media or for a long term retention period, allocation is provided on devices such as flash memories benefiting in terms of power consumption and long term storage.

(3) Allocation is provided on storage devices to reduce power consumption. For example, with reference to FIG. 10, depending on the power consumption of the device and operation status of each component, lower power consumption devices (such as flash memories and HDD under control of the MAID scheme) are selected, so that storage area of the lower power consumption devices are preferentially allocated for data. By using such a table as is shown in FIG. 14, for grasping the usage status of the devices through the system S, allocation control can be made so as to reduce the power consumption of the devices through the system S.

Figure 15:
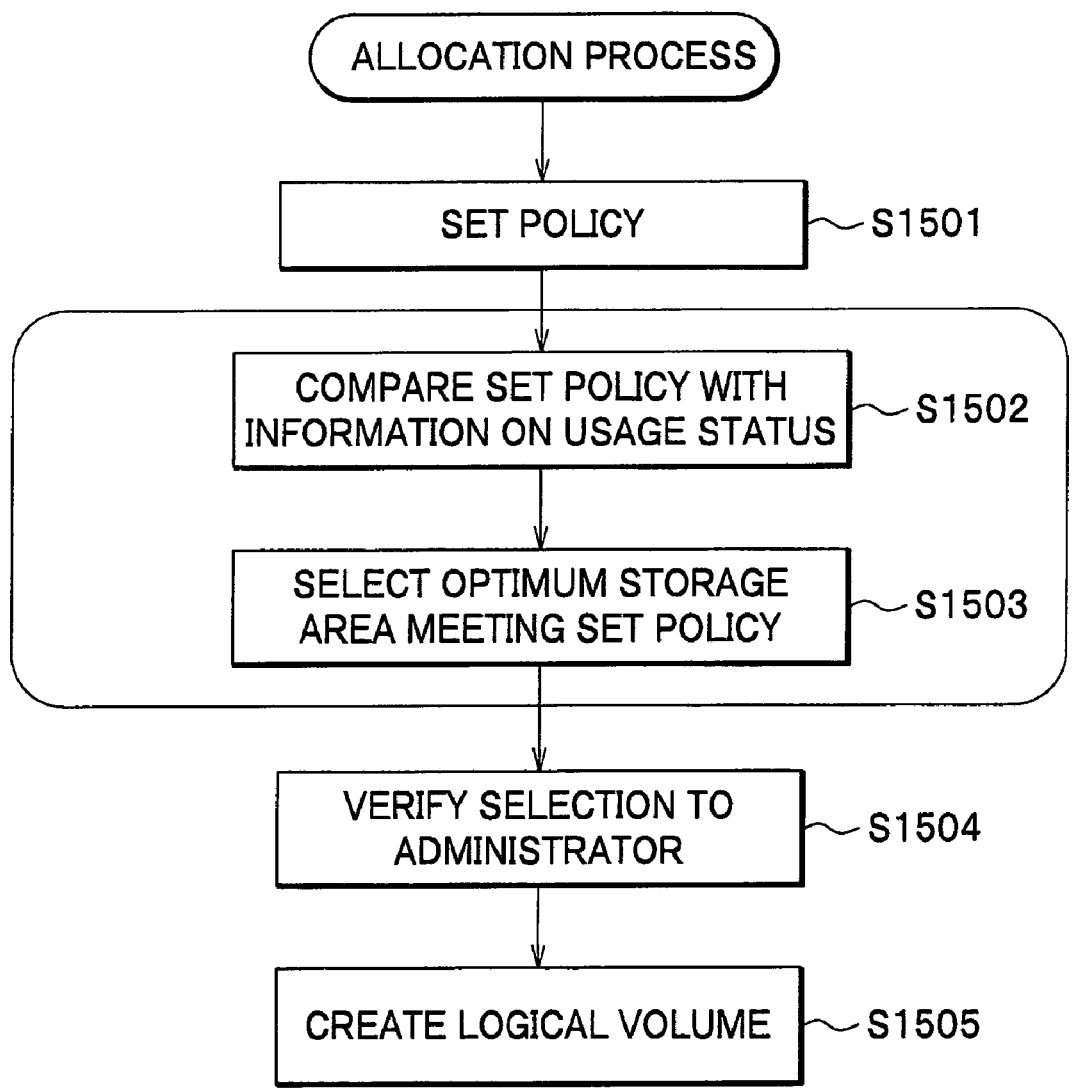
FIG. 15 shows a process flow for selecting a device as data storage destination that meets user-specified requirement.

FIG. 15 shows a process flow for controlling allocation of storage area for data. This process is performed by the MP unit 220 of the storage control device 101 as shown in FIG. 6.

The MP unit 220 receives specifications about attributes and policies in accordance with data to be stored, which are requested for the data storage destination. For example, attributes regarding capacities, performance, R/W frequencies, WORM or not, and archiving are specified for logical volumes serving as data storage destinations. The specified policies are managed on the table shown in FIG. 16 (described later) (S1501).

Next, the MP unit 220 compares information managed on the tables as shown in FIGS. 7 to 10 with the policies that are specified at S1501. For example, the MP unit 220 compares data size specified by the user with capacities of free low power consumption device pools 1004 (S1502).

Depending on the comparison at S1502, the MP unit 220 selects a candidate destination that has currently been determined as an optimum allocation destination. For example, if policies for certain data are specified such that the write frequencies are "small", the read frequencies are "great", the read performance is "high", the MP unit 220 selects such storage area as are constituted by flash memories. If the data is specified to be stored in WORM volumes, the MP unit 220 selects such storage area as are constituted by flash memories. In another example, if policies are specified such that write frequencies and read frequencies are both "small" and the read performance is "low", the MP unit 220 selects storage area such as MAID controlled ATA disk drives. In a further example, the user's specification on policies is such that the write frequencies and read frequencies are both "great", the MP unit 220 selects SCSI HDD drives as optimum storage area. In the case that it is impossible to make a definite determination, the MP unit 220 preferentially allocates storage area constituted by flash memories (S1503).

Following S1503, the MP unit 220 informs the user or the system administrator of the selected storage area, for verification of the selected data storage destination (S1504).

Then, in accordance with decisions made by the user or the system administrator, the MP unit 220 creates logical volumes on the selected storage area (S1505).

Although it has been described as an example that the above allocation process is performed chiefly by the MP unit 220, this process may be performed by executing programs on management unit 603 or on the management terminal 601. The system S shown in FIG. 6 is configured to receive via communication paths policy specifications sent from the user or the system administrator, necessary for the above described allocation processes. The system is also configured to access via communication paths to the memory units 113 storing various tables including tables described later, based on which various determinations are made. Therefore, the above described allocation processes may be executed at any units of the system or in combination thereof. For example, the allocation processes may be performed in combination of units of the system such that the management terminal 601 may serve as an interface with the user or the system administrator such as input of policies, display of selections or confirmations, the MP unit 220 serves for acquiring information on the tables, and management unit 603 provides a comprehensive determination on the inputted information and the information on the tables.

FIG. 16 shows an example of a management table for determining devices for storage destination.

A user-specified requirement table 1600 (also referred to as "a user-specification table") includes a capacity field 1601 for storing each capacity value for each volume constituting storage area or each data to be stored, and a user-specified requirement field 1602 for storing requirements specified by the user. Although the user-specified requirement field 1602 may store specific values such as "I/O property/response time [100] ", "required power [1 W or less]", "performance/response time [1 μs or less]", qualitative values are included herein in the user-specified requirement field 1602 herein, for convenience' sake. The user-specified requirement table 1600 may further include a specified device type 1603, including a field directly specifying device types, for example "ATA disk drives" or "SCSI disk drives", in addition to the above user-specified requirement field (1602).

As shown in FIG. 19. a device determining requirement table 1900 (also referred to as "a storage media management table") includes a user-specified requirement field 1901 and a first candidate device type field 1902. The user-specified requirement table 1901 stores values corresponding to those in the user-specified requirement table 1600 in FIG. 16. The first candidate device type filed 1902 indicates a device type as a first candidate for the user's specified requirement.

The user-specified requirements shown in FIG. 16 may include values with priorities. With reference to flow charts of FIG. 15 and FIG. 16, descriptions will be given on a process of selecting data storage area in the case that the user-specified requirements carry priorities.

Figure 17:
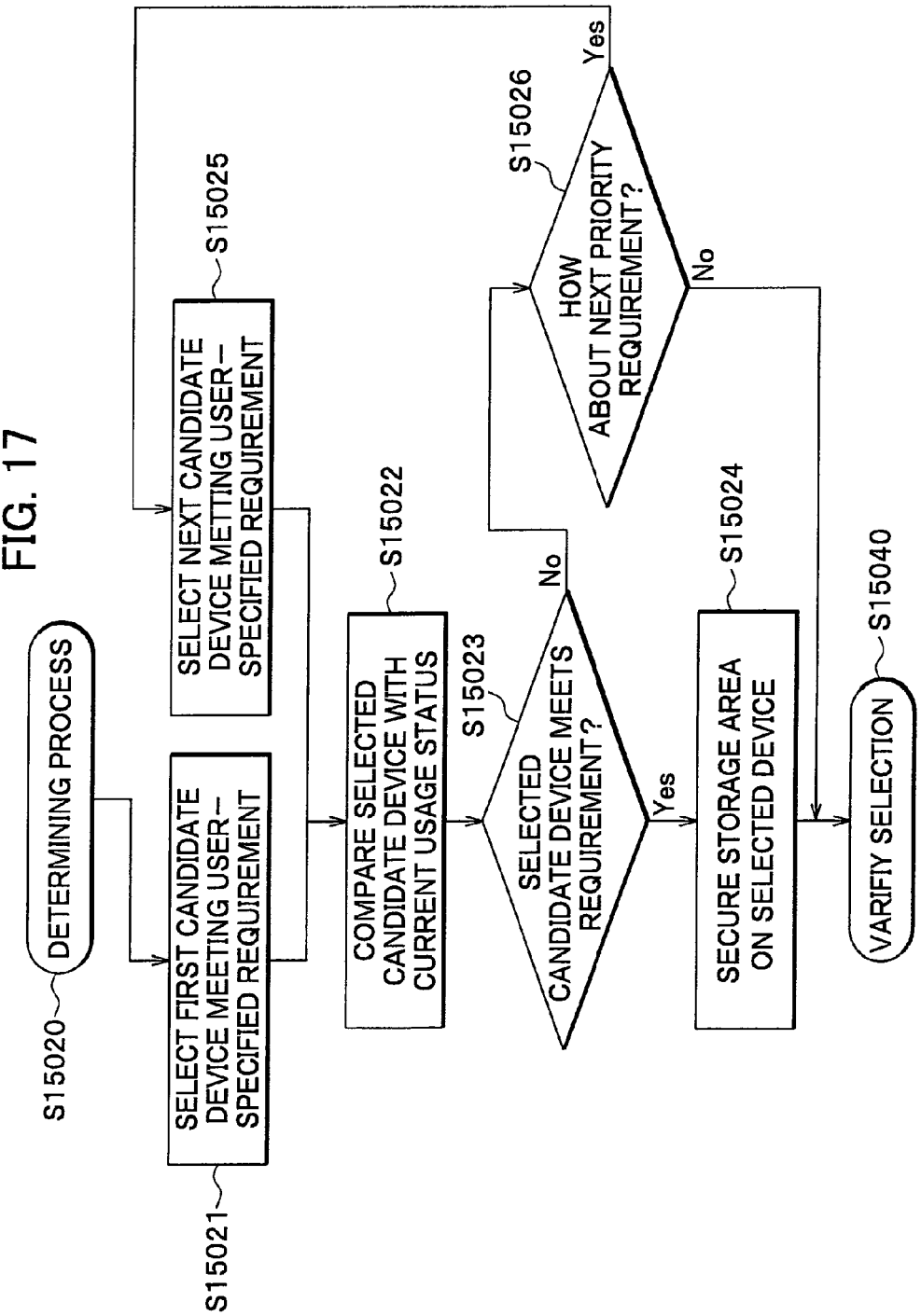
FIG. 17 shows a process flow for selecting a device as data storage destination that meets user-specified requirement with priority.

If the user-specified requirement carries any priorities, the MP unit 220 executes processes of S15020 to S15026 in FIG. 17 at S1502 and S1503 in FIG. 15.

First, the determining process is executed at S15020 in FIG. 17.

The MP unit 220 selects an allocation destination as a first candidate destination, using the user-specified requirement table 1600 and the device determining requirement table 1900. In an example of the entry #0 in FIG. 16, the MP unit 220 selects a flash memory device as an allocation destination. In an example of the entry #1 in FIG. 16, the MP unit 220 selects ATA disk drives as a specified device (S15021).

Next, the MP unit 220 checks such usage statuses as are managed in each table of FIG. 8 to FIG. 10 (S15022).

Then, the MP unit 220 determines whether or not there is any device area meeting the user-specified requirement (S15023).

If there is any device area that meets the requirement at S15023, the process proceeds to S15024, where the MP unit 220 secures required capacity, confirms the selected data storage destination, and then the process proceeds to S15040.

If there is no device area corresponding to the first candidate allocation, depending on the determination based on the usage status, a second allocation candidate destination may be selected depending on the determination based on the second priority.

For example, if there is no device area that meets the requirement at S15023, requirement with a second priority can be checked with inquiring a user-specified requirement table 1800 in FIG. 18.

FIG. 18 shows an example of the user-specified requirement table 1800 carrying priorities. The user-specified requirement table 1800 includes a capacity filed 1801 for storing values of required capacity for the allocation destination, user-specified requirement priority fields 1802 to 1804 that carry priorities and a specified device type field 1805 for specifying a device. For example, the entry #0 of the user-specified requirement table 1800 in FIG. 18, has a read/write ratio of "write: small, read: great" as a first priority for the user-specified requirement, lower power consumption as a second priority, and performance as a third priority.

With reference to FIG. 17 again, if the user specifies a requirement such as "write: small, read: great" as in the entry #0 in FIG. 18, the MP unit 220 is to select flash memory area or ATA disk drive, with inquiring the table of the FIG. 19 at S1501. If there are no flash memories that the MP unit 220 can select based on the usage status, the MP unit 220 determines there are no devices that meet the user-specified requirement and the usage status, and the process proceeds to S15026.

The MP unit 220 determines whether or not there are any requirements having a second priority (S15026).

At S15026, if there are any requirements having the second priority, the process proceeds to S15025, and reselects a candidate destination for an allocation destination that meets the user-specified requirement. For example, as shown in the entry #0 of the user-specified requirement table 1800 in FIG. 18, if the second priority is "lower power consumption" and the lowest priority is "performance", ATA disk drives (MAID controlled HDD) is to be selected as a next candidate destination that meets the user-specified requirements other than flash memory area (S15025).

Following the above step, at S15022, the MP unit 220 provides a comprehensive determination on the usage status, and secures area that is required at S15024, and then proceeds to S15040 to confirm the data storage destination that has been selected.

If it becomes difficult to select a first candidate device as a first candidate destination, this is likely due to variations in possibilities for selecting a device depending on device usage status. To be specific, it is assumed that the first candidate destination is selected from area of flash memories or ATA disk drives (MAID controlled HDD) as an allocation destination. If there only remain devices having write frequencies beyond predetermined cycles of writing or having no available capacities enough for user-required capacities, the selected device does not serve as efficient data storage area. On the other hand, if data is specified to be stored on such devices as WORM in which write frequencies are limited, devices even having more cycles of writing can be allocated, so that selected devices serve as effective data storage area. Further, if priorities of the user-specified requirement are such that the performance level is the same, the read and write ratio is "read: great, write: small" and the power consumption is low, ATA disk drives (MAID controlled HDD) can be selected as a second candidate even if flash memory area as a first candidate is unavailable, so that the user-specified requirement can be met. As descried above, according to the second embodiment of the present invention, it is possible to provide a selection process of the data storage destination in accordance with the usage status of the storage system S.

The storage system S according to the first and second embodiments of the present invention can realize a system with low power consumption, no deterioration in performance on required data, configurable in a large scale, and capable of storing data into optimum storage media. The storage system S can also enhance reliability and availability over the system with respect to properties (such as endurance of rewriting cycles and fault tolerance) that each storage medium has.

The embodiments according to the first and second embodiments of the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A storage system comprising:
   a plurality of SCSI (Small Computer System Interface) disk devices storing data received from a host computer;
   a plurality of ATA (Advanced Technology Attachment) disk devices storing data received from the host computer;
   a plurality of non-volatile devices storing data received from the host computer; and
   a processing unit controlling read/write requests received from the host computer to a plurality of logical volumes configured by at least one to the plurality of SCSI disk devices, the plurality of ATA disk devices and the plurality of non-volatile devices, and managing relation between storage hierarchy devices including the plurality of SCSI disk devices, the plurality of ATA disk devices and the plurality of non-volatile devices, and attribution information of each of the plurality of SCSI disk devices, the plurality of ATA disk devices and the plurality of non-volatile devices,
   wherein the processing unit determines a first storage layer of the storage hierarchy devices as a source storage layer and a second storage layer of the storage hierarchy devices as a destination storage layer, based on a user policy of I/O performance and power consumption, and migrates data stored in at least one of the logical volumes of the first storage layer to at least one of the logical volumes of the second storage layer, based on the user policy.

2. The storage system according to claim 1, wherein the processing unit controls a rotation speed of at least one of the plurality of SATA disk devices to reduce power consumption.

3. The storage system according to claim 1,
   wherein the user policy is set by real-time access pattern from the host computer to at least one of the logical volumes related to the plurality of SCSI disk devices, the plurality of ATA disk devices, or the plurality of non-volatile devices.

4. The storage system according to claim 1,
   wherein the processing unit manages a usage status management table that stores usage status information related to endurance of each of the plurality of non-volatile devices, and endurance threshold values,
   wherein the processing unit manages a read/write cycle management table that stores read cycles and write cycles for each of the plurality of logical volumes,
   wherein, if the processing unit requests to optimize performance of the storage system, the processing unit determines the first storage layer as the source storage layer and the second storage layer as the destination storage layer based on the usage status management table and the read/write cycle management table.

5. The storage system according to claim 4,
   wherein the processing unit further manages a device type management table that stores information of amount of power consumption per a certain time period of at least one type of disk device and a type of a non-volatile device, and counts a total amount of power consumption of the plurality of SCSI disk devices that are active, the plurality of ATA disk devices that are active, and the plurality of non-volatile devices that are active, based on the device type management table,
   wherein, if the processing unit requests to optimize performance of the storage system, the processing unit determines the first storage layer as the source storage layer and the second storage layer as the destination storage layer based on the usage status management table and the read/write cycle management table, and migrates data stored in at least one of the logical volumes of the first storage layer to at least one of the logical volumes of the second storage layer based on the priority of conditions including the power consumption and the endurance of the non-volatile devices.

6. The storage system according to claim 5,
   wherein, if the processing unit requests to optimize the total amount of power consumption as a higher priority, the processing unit detects a first logical volume configured by a disk device in which the read cycles to the write cycles ratio exceeds a predetermined threshold based on the read/write cycle management table, and the processing unit determines the disk device as the first storage layer and the non-volatile devices as the second storage layer.

7. The storage system according to claim 5,
   wherein, if there is no free capacity of the non-volatile device, the processing unit generates free capacity for a certain non-volatile device of the plurality of non-volatile devices by migrating data from the certain non-volatile device to one of the SCSI disk devices or the ATA disk devices within a range of a condition in a higher priority of the total amount of power consumption.

8. The storage system according to claim 5,
   wherein, if there is no free capacity of the non-volatile device, and there is no non-volatile devices which meets the condition of the endurance of the non-volatile devices based on the usage status management table, the processing unit determines not to migrate data from the first storage layer to the second storage layer based on the priority of conditions including the power consumption and the endurance of the non-volatile devices.

9. The storage system according to claim 5,
   wherein, if the processing unit requests to optimize the endurance of the non-volatile devices as a higher priority, if the processing unit detects the usage status of one of the plurality of non-volatile device exceeds the endurance threshold based on the usage status management table, the processing unit determines the non-volatile device as the first storage layer and the SCSI disk devices and the ATA disk devices as the second storage layer.

10. The storage system according to claim 5,
    wherein the processing unit manages the usage status management table that stores usage status information related to endurance of each of the plurality of ATA disk devices and endurance threshold values.

11. The storage system according to claim 5,
    wherein the processing unit requests to optimize the total amount of power consumption or the endurance of the non-volatile devices periodically, by receiving read/write requests from the host computer, or by receiving a direction from the host computer to specify a certain logical volume as a WORM (Write Once Read Many).

12. The storage system according to claim 5,
    wherein each non-volatile device has less rewritable cycles than those of the SCSI disk devices and the ATA disk devices, wherein the usage status management table includes cycles of rewriting as the usage status information for each non-volatile devices, and a threshold value for the cycles of rewriting as the endurance threshold value, and wherein, if the processing unit requests to optimize the endurance of the non-volatile devices as a higher priority, if the processing unit detects the usage status of cycles of rewriting one of the plurality of non-volatile device exceeds the threshold value for the cycles of rewriting based on the usage status management table, the processing unit determines the non-volatile device as the first storage layer and the SCSI disk devices and the ATA disk devices as the second storage layer.

13. The storage system according to claim 5, wherein each SCSI disk device and each ATA disk device has lower read response speed than that of each non-volatile device, wherein the usage status management table includes usage cycles of reading data as the usage status information of each non-volatile device and a threshold value for the usage cycles of reading data as the endurance threshold value, wherein, if the processing unit requests to optimize the total amount of power consumption as a higher priority, if the processing unit detects the usage status of usage cycles of reading data of one of the plurality of non-volatile device does not exceed the threshold value for the usage cycles of reading data based on the usage status management table, the processing unit determines the non-volatile device as the second storage layer and the SCSI disk devices and the ATA disk devices as the first storage layer.

14. The storage system according to claim 5, wherein the usage status management table includes the number of faulty areas as the usage status information of each non-volatile device and a threshold value for the number of faulty areas as the endurance threshold value, and wherein, if the processing unit requests to optimize the endurance of the non-volatile devices as a higher priority, and if the processing unit detects the usage status of the number of faulty areas of one of the plurality of non-volatile device exceeds the threshold value for the number of faulty areas based on the usage status management table, the processing unit determines the non-volatile device as the first storage layer and the SCSI disk devices and the ATA disk devices as the second storage layer.

15. The storage system according to claim 5, wherein, if the second storage layer is the non-volatile devices, the processing unit secures a certain area on the SCSI disk device or the ATA disk device as a temporary storage area and copies the data to be migrated, part by part in succession, to the temporary storage area, and wherein when receiving a read request for part of the data from the host computer during the data migration operation, the processing unit resends corresponding data stored in the SCSI disk device or the ATA disk device of the first storage layer to the host computer, and asynchronously processes the data migration, part by part in succession, to the non-volatile device of the second storage layer.

* * * * *